US006185171B1

(12) United States Patent
Bassett et al.

(10) Patent No.: US 6,185,171 B1
(45) Date of Patent: Feb. 6, 2001

(54) SYSTEM FOR ACCOMMODATING VIBRATIONS RESULTING FROM ROTATING A DATA STORAGE MEDIUM

(75) Inventors: Stephen J. Bassett; Michael A. Winchell, both of Fort Collins, CO (US)

(73) Assignee: LSI Logic Corporation, Milpitas, CA (US)

(*) Notice: Under 35 U.S.C. 154(b), the term of this patent shall be extended for 0 days.

(21) Appl. No.: 09/106,728

(22) Filed: Jun. 29, 1998

(51) Int. Cl.[7] ........................................................ G11B 7/00
(52) U.S. Cl. ........................... 369/50; 369/47; 369/44.32; 360/78.09
(58) Field of Search .................................. 369/50, 54, 47, 369/32, 48, 44.32; 360/78.09, 78.04, 77.04, 69, 73.03; 700/48; 706/23, 25, 906

(56) References Cited

U.S. PATENT DOCUMENTS

| | | | |
|---|---|---|---|
| 4,600,863 | 7/1986 | Chaplin et al. | 318/114 |
| 4,808,863 | 2/1989 | Andersson | 310/51 |
| 5,402,400 | 3/1995 | Hamada et al. | 369/32 |
| 5,471,381 | * 11/1995 | Khan | 700/48 |
| 5,473,698 | 12/1995 | Garnjost et al. | 381/71 |
| 5,493,631 | 2/1996 | Huang et al. | 395/22 |
| 5,510,939 | 4/1996 | Lewis | 360/78.09 |
| 5,532,990 | 7/1996 | Koyama et al. | 369/44.32 |
| 5,555,231 | * 9/1996 | Yamamoto | 369/54 |
| 5,585,976 | 12/1996 | Pham | 360/77.04 |
| 5,608,843 | 3/1997 | Baird, III | 395/23 |
| 5,609,230 | 3/1997 | Swinbanks | 188/267 |
| 5,677,609 | * 10/1997 | Khan et al. | 360/78.09 |
| 5,936,787 | * 8/1999 | Ohmi | 369/50 |
| 6,029,095 | * 2/2000 | Boissy et al. | 360/78.09 |
| 6,052,349 | * 4/2000 | Okamoto | 369/59 |

* cited by examiner

Primary Examiner—Thang V. Tran

(57) ABSTRACT

A control system in a data storage apparatus and associated methods for attempting to accommodate the vibrations resulting from rotating a data storage medium. The control system comprises a neural network which utilizes detected vibrations resulting from the rotation of data storage media to learn the characteristics of the rotational imbalance of rotating data storage media. Thereafter, the rotation of a data storage medium and/or movement of a data head is controlled based on the characteristics learned.

49 Claims, 25 Drawing Sheets

SYSTEM FOR ACCOMMODATING VIBRATIONS RESULTING FROM ROTATING A DATA STORAGE MEDIUM

The present invention relates generally to control systems involving data storage apparatuses, and more specifically relates to a control system which accommodates vibrations resulting from rotating a data storage medium in a data storage apparatus.

BACKGROUND

Data storage apparatuses typically provide that some type of data storage medium is rotated as data is read from or written to the data storage medium. For many different reasons, the rotation of the data storage medium usually results in at least some amount of vibration. For example, due to manufacturing tolerances, the data storage medium typically is not perfectly planar. As a result, the disc storage medium may wobble when it is rotated. Of course, the wobble becomes greater with higher speeds of rotation, and increased vibrations are produced. As a consequence of the wobble and vibrations, data may not be able to be retrieved from or written to the data storage medium, or worse, the data storage medium and/or the data storage apparatus may become damaged as a result of rotating the data storage medium.

Vibrations resulting from rotating a data storage medium in a data storage apparatus are particularly prevalent when a data storage apparatus is used to rotate several different data storage media where each data storage medium is removable from the data storage apparatus and is relatively heavy. One example of the foregoing is where the data storage apparatus is used with several different removable data storage media. In this case, due to the different manufacturing tolerances in the industry, the vibrations which will result from rotating a given data storage medium are extremely difficult, if not impossible, to predict.

Additionally, some removable data storage media, such as CD-ROMS, are relatively heavy which causes a substantial amount of inertia when the disc is rotated.

Several other factors may contribute to the vibrations which result from rotating a data storage medium. For example, typically, data storage media, such as a CD-ROM, include a label and/or ink thereon which provides visible indicia relating to the contents of the data storage medium, the source of the data storage medium, etc. Along with manufacturing tolerances, the label and/or ink distribution may provide another source of imbalance when the data storage medium is rotated, and may increase the vibrations resulting from the rotation thereof.

Still more sources of vibrations resulting from rotating a data storage medium, such as CD-ROM, are manufacturing tolerances of the spindle and chuck assembly which chucks, or retains, the data storage medium, and the precision with which the chuck actually engages the data storage medium before and during rotation.

Augmenting the unpredictability of the vibrations resulting from rotating a given data storage medium is the manner in which some data storage devices operate. Some typical data storage devices operate in a Constant Linear Velocity (CLV) mode where the angular velocity of the data storage medium is varied to provide a substantially constant linear velocity of the medium under the data (data read and/or data write) head as the head is moved radially across the disc. Generally, present data storage devices provide a two-and-a-half time speed difference from the slowest angular velocity when the data head is at the outermost portion of the medium to the fastest angular velocity when the data head is at the innermost portion of the medium. Such speed changes inevitably produce different vibration characteristics.

While data storage devices have actually evolved to operate in a modified or zoned Constant Angular Velocity (CAV) mode, such drives span a two to three times difference between the minimum and maximum spindle speeds. Therefore, vibrations are still an issue.

While data storage devices have become faster and faster in recent years, vibrations resulting from rotating a data storage medium have limited the speed at which the medium can be rotated and have limited the rate at which data can be reliably read from or written to the medium. In fact, the overall reliability of a data storage device generally degrades with faster rates of rotation. The emergence of, for example, DVD-ROM drives with a faster data rate for a given comparable spindle rate also requires minimal vibration in order to improve read and writeability. In fact, with the rotation of any data storage medium comes the necessity to counteract the vibrations which result from the rotation in order to read or write data as quickly as possible.

OBJECTS AND SUMMARY

It is an object of the present invention to provide a control system which suitably accommodates the vibrations resulting from rotating a data storage medium.

It is a further object of the present invention to provide a control system which counter-acts the vibrations associated with rotating a data storage medium.

It is a further object of the present invention to provide a control system which can adapt to different data storage media and speeds of rotation.

It is a further object of the present invention to provide a control system which allows data to be reliably read from or written to a data storage medium which is rotating at a relatively high spindle rotation rate including, possibly, a spindle rotation rate which is higher than the present state of the art.

In accordance with these and other objects, the present invention provides a control system for attempting to accommodate the vibrations resulting from rotating a data storage medium in a data storage apparatus. The control system includes a neural network which utilizes detected vibrations resulting from the rotation of data storage media to learn the characteristics of the rotational imbalance of the rotating data storage media and subsequently controls rotation of a data storage medium and/or movement of the data head based on the characteristics learned.

One aspect of the present invention provides a balance control system for attempting to balance a rotating data storage medium. The balance control system includes at least one balancing actuator contactable with the rotating data storage medium, and a data head associatable with the rotating data storage medium for reading data from and/or writing data to the rotating data storage medium, where the data head is capable of detecting data tracks on the rotating data storage medium. The system also includes control circuitry in communication with the data head for counting the data tracks on the rotating data storage medium detected, and includes a processor in communication with the control circuitry and the one or more balancing actuators. The processor receives from the control circuitry information related to the data tracks detected by the data head and derives balancing actuator direction information. The processor communicates the balancing actuator direction information to the one or more balancing actuators thereby altering the vibration of the data storage medium. Preferably, a plurality of orthogonal linear actuators contact the rotating data storage medium so that the rotation of the data storage medium can be altered precisely in two, or preferably three, dimensions. Also, preferably the data head is floatable in response to rotational imbalance of the rotating data storage medium, where the data head detects data tracks on the rotating data storage medium while the data head is floating.

In addition to, or as an alternative to, the above, a balance control system in accordance with the present invention may include a detector associated with the data head for detecting a light beam directed to a rotating data storage medium. The balance control system further includes a processor in communication with the detector and one or more balancing actuators. The processor receives from the detector information related to the light beam on the data storage medium and derives balancing actuator direction information therefrom, and the processor communicates the balancing actuator direction information to the one or more balancing actuators thereby altering the vibration of a data storage medium. Likewise, preferably the data head is floatable and oscillates in response to rotational imbalance of the rotating data storage medium, and the data head detects data tracks while floating.

In addition to, or as an alternative to, the above, a balance control system in accordance with the present invention may include vibration detection devices, such as accelerometers, which detect vibrations of the data storage medium when it is rotated. The balance control system further includes a processor in communication with the vibration detection devices and with at least one balancing actuator. The processor receives information from the vibration detection devices related to the vibration of the data storage medium and derives balancing actuator direction information therefrom, and the processor communicates the balancing actuator direction information to the balancing actuators thereby altering the vibration of the data storage medium in preferably all three dimensions.

Another aspect of the present invention provides a data head movement control system which includes an undriven, movable data head which is driveable and associatable with the rotating data storage medium for reading data therefrom and/or writing data thereto. The data head is capable of detecting data tracks on the rotating data storage medium in both an undriven and driven state. The system may also include control circuitry in communication with the data head for counting the data tracks on the rotating data storage medium detected by the undriven data head and for controlling the movement thereof.

The system may still further include a processor in communication with the control circuitry, where the processor receives from the control circuitry information related to the data tracks detected by the data head and derives data head movement direction information therefrom. The processor communicates the data head movement direction information to the control circuitry thereby dictating the control of movement of the data head while the data head reads data from and/or writes data to a rotating data storage medium. As with the balance control system, preferably the data head is floatable in response to rotational imbalance of the rotating data storage medium, and the data head detects data tracks while floating.

In addition to, or as an alternative to, the above, a data head movement control system in accordance with the present invention may include a detector associated with the data head for detecting the light beam directed to the rotating data storage medium, and a processor in communication with the detector and at least one data head movement mechanism such as a focus mechanism. The processor receives from the detector information related to the light beam detected by the detector and derives data head movement direction information therefrom. The processor communicates the data head movement direction information to the at least one data head movement mechanism thereby dictating the control of movement of the data head while the data head reads data from and/or writes data to a rotating data storage medium.

In addition to, or as an alternative to, the above, a data head movement control system in accordance with the present invention may include vibration detection devices, such as accelerometers, which detect vibrations of the data storage medium when it is rotated. The data head movement control system further includes a processor in communication with the vibration detection devices and at least one data head movement mechanism. The processor receives information from the vibration detection devices related to the vibration of the data storage medium and derives data head movement direction information therefrom. The processor communicates the data head movement direction information to the at least one data head movement mechanism thereby dictating the control of movement of the data head while the data head reads data from and/or writes data to a rotating data storage medium.

The present invention also provides a method of attempting to accommodate vibrations resulting from rotating a data storage medium in a data storage apparatus. The method includes the steps of rotating the data storage medium and detecting vibrations resulting therefrom. The method also includes the steps of learning the characteristics of the rotational imbalance of the rotating data storage medium based on the vibrations detected, and adapting by controlling the rotation of a data storage medium and/or the movement of a data head based on the characteristics of the rotational imbalance of the rotating data storage medium while reading data from and/or writing data to the rotating data storage medium.

One aspect of the present invention provides a method of attempting to accommodate vibrations resulting from rotating a data storage medium in a data storage apparatus where the method includes the steps of detecting data tracks on the rotating data storage medium using a data head associatable with the data storage medium for at least one of reading data therefrom or writing data thereto, counting the data tracks detected, deriving balancing actuator direction information from the number of data tracks counted, and using the balancing actuator direction information to control at least one balancing actuator contactable with a data storage medium to alter the rotation thereof. Preferably, the method includes the step of allowing the data head to float in response to rotational imbalance of the rotating data storage medium.

In addition to, or as an alternative to, the above, a method of attempting to accommodate vibrations resulting from rotating a data storage medium in a data storage apparatus in accordance with the present invention provides the steps of deriving data head movement direction information from the number of data tracks counted, and using the data head movement direction information to control the movement of the data head while the data head reads data from and/or writes data to a rotating data storage medium. Additionally, preferably the method includes the steps of determining a range of oscillation of the data storage medium and deriving the balancing actuator direction information and/or the data head movement direction information based on the range of oscillation.

In addition to, or as an alternative to, the above, a method of attempting to accommodate vibrations resulting from rotating a data storage medium in a data storage apparatus in accordance with the present invention provides the steps of using vibration detection devices, such as accelerometers, to derive balancing actuator direction information and/or data head movement direction information. Then, this information is used to control balancing actuators which contact the data storage medium and alter the rotation of a data storage medium, or is used to control movement of the data head using mechanisms such as a focus mechanism and a tracking mechanism.

Another aspect of the present invention provides a method of attempting to accommodate vibrations resulting from rotating a data storage medium in a data storage apparatus including the steps of rotating the data storage medium, directing a light beam on the rotating data storage medium, detecting the light beam on the rotating data storage medium, deriving balancing actuator direction information from that which is detected, and using the balancing actuator direction information to control at least one balancing actuator contactable with a data storage medium to alter the rotation thereof.

In addition to, or as an alternative to, the above, a method of attempting to accommodate vibrations resulting from rotating a data storage medium in a data storage apparatus in accordance with the present invention provides the steps of deriving data head movement direction information from that which is detected, and using the data head movement direction information to control movement of the data head while the data head reads data from and/or writes data to a rotating data storage medium. Preferably, the method includes using a plurality of diodes to optically sense the shape of the light beam on the rotating data storage medium, and further includes determining a range of oscillation of the rotating data storage medium and deriving the balancing actuator direction information and/or the data head movement direction information based on the range of oscillation.

The present invention is particularly useful in accommodating the vibrations associated with rotating, for example, a CD-ROM disc in a CD-ROM drive because vibrations are invariably compounded by certain characteristics of the typical CD-ROM drive and discs, some of which have been discussed hereinabove. However, vibration problems associated with rotating a data storage medium are certainly not unique with respect to CD-ROM drives, but instead affect essentially all data storage apparatuses which function in association with either removable or fixed rotatable data storage media. Therefore, the present invention is generally directed to accommodate the vibrations associated with rotating any type of data storage medium in a data storage apparatus, and is not restricted to CD-ROM drives and discs.

BRIEF DESCRIPTION OF DRAWINGS

The present invention and the advantages thereof will become more apparent upon consideration of the following detailed description when taken in conjunction with the accompanying drawings of which.

DETAILED DESCRIPTION OF EMBODIMENTS

Figure 1:
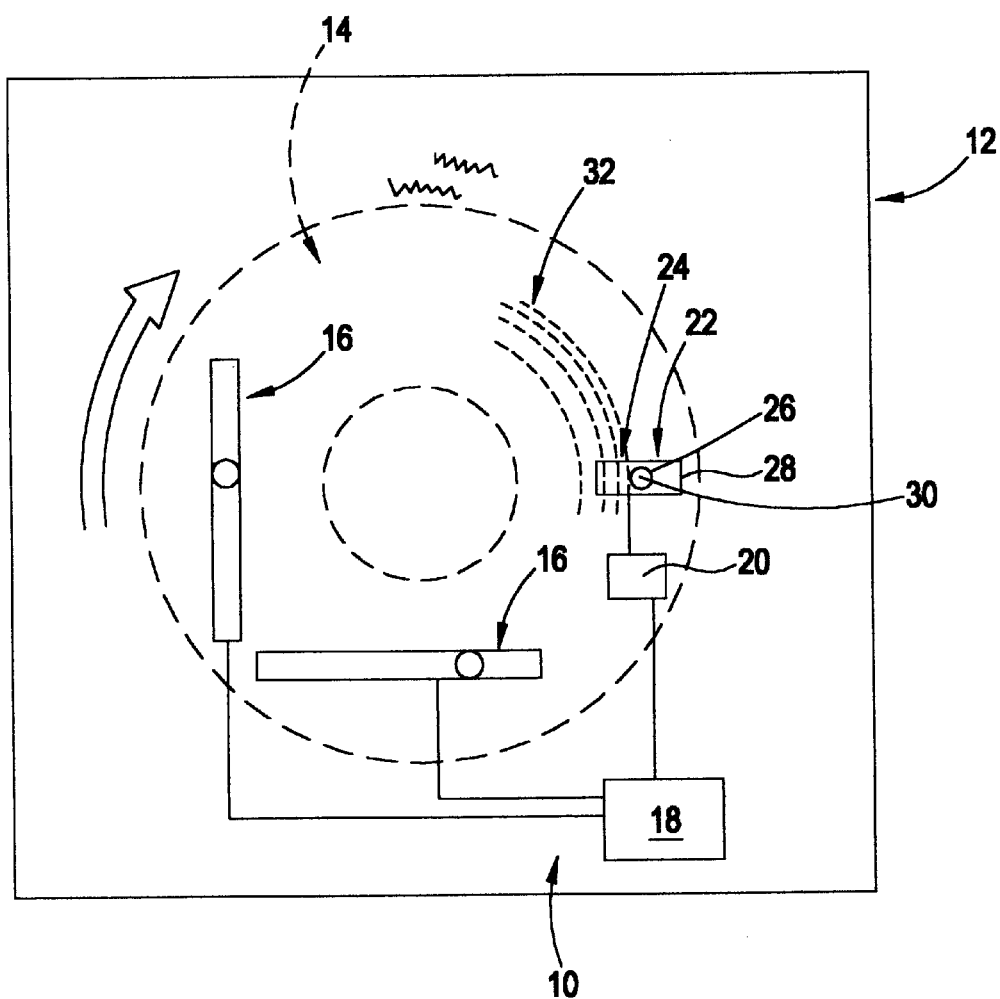
FIGS. 1–3 are schematic diagrams of a balance control system illustrating with an arrow a data storage medium rotating and illustrating with "wiggle" lines vibrations resulting therefrom and a data head floating in response thereto.

Illustrated in FIGS. 1–27 are control systems in accordance with the present invention for attempting to accommodate the vibrations resulting from rotating a data storage medium. The present invention may be used in connection with many different types of data storage media. One area in which the present invention in especially useful is in connection with CD-ROMS. Therefore, in the following description, first certain aspects of the general construction and operation of a typical CD-ROM drive will be explained, and then embodiments of the present invention will be described.

A typical CD-ROM drive includes a spindle and chuck assembly for engaging the center hole in a CD-ROM disc and subsequently rotating the CD-ROM disc. While the disc is being rotated, a data head is activated to read data from and/or write data to the CD-ROM disc. A typical data head is moveable via a tracking mechanism which includes a sled and head assembly where the sled (carrying the head) is movable with regard to the disc via a rack and pinion worm gear (or other means), and the head is moveable within the sled via magnetic actuation. Movement of the head within the sled is often performed for micro-movements of the head (fine positioning), such as where the head must relocate to a nearby data track on the disc. In contrast, movement of the sled is reserved for macro-movements of the head, such as where the head must relocate to a relatively distant data track on the disc (coarse positioning).

When powered, the head directs a laser light beam to the disc so that the head can either read data from or write data to the disc. Additionally, control circuitry is associated with the head thereby enabling data tracks on the disc to be detected and counted so that the head can be moved accurately to a specific data track on the disc.

The typical CD-ROM drive also provides that as the laser light beam is directed to a specific data track on the disc, an optical sensor senses the shape of the light beam reflected off of the disc. Through astigmatic optical physics, the shape of the light beam will be circular when the light beam is perfectly focused on the disc, and the head is not moved either closer to or further away from the disc. If the shape of the light beam is an ellipse, then the head is either moved closer to or further away from the disc (depending on which axis of the ellipse is the major axis, and which axis of the ellipse is the minor axis) to focus the light beam on the disc. To this end, a focus actuator may be used. The astigmatic design approach that provides the focusing technique is a current and popular approach, however other approaches are available.

In this manner, the typical CD-ROM drive provides essentially one feedback control system where detected data tracks are used to move the head in one dimension to align the head with a specific data track, and provides another feedback control system where the detected shape of a laser light beam is used to move the head in another, single dimension to keep the head focused on the data.

To attempt to accommodate for shock or transient forces, many CD-ROM drives use a buffer to which data read from the CD-ROM disc is initially transferred. Specifically, as the head first reads data from the CD-ROM disc, the data is first written to the buffer before forwarding to the ultimate destination. Therefore, data is not truly read in real-time, and should a shock cause the head to jump data tracks while reading data, the head can relocate while data is read from the buffer. Ideally, the head relocates and feeds data to the buffer before the buffer is cleared and there is no lag and no perceived interruption in data transfer.

While certain aspects of the present invention can be utilized within one or more feedback control systems (as will be described), it is preferred that the present invention be used to provide essentially one or more feedforward control systems whereby data storage media (the training set) are rotated and vibrations resulting from the rotation of the data storage media are detected in order to learn the general characteristics of the rotational imbalance of rotating data storage media (learning phase). Subsequently, neural network coefficients are set, and the rotation of a data storage medium and/or the movement of a data head is controlled based on the characteristics learned (control phase). In other words, the vibrations are essentially "predicted" and counter-measures taken in anticipation thereof. This will become more readily apparent by reviewing the following description of the different embodiments of the present invention.

FIGS. 1–5 depict a balance control system 10, or neural network, in a data storage apparatus 12 for learning the vibrations which result from rotating a data storage medium 14 and counteracting the vibrations as data is read therefrom and/or is written thereto. The data storage apparatus 12 may be a CD-ROM drive, and the data storage medium 14 may be a CD-ROM disc. However, the present invention is not limited thereto. For example, the data storage medium 14 need not even be removable, and the data storage apparatus 12 may be a data write device rather than, or in addition to, being a data read device. Still further, the present invention may be applied in association with both optical and magnetic data storage systems.

Figure 5:
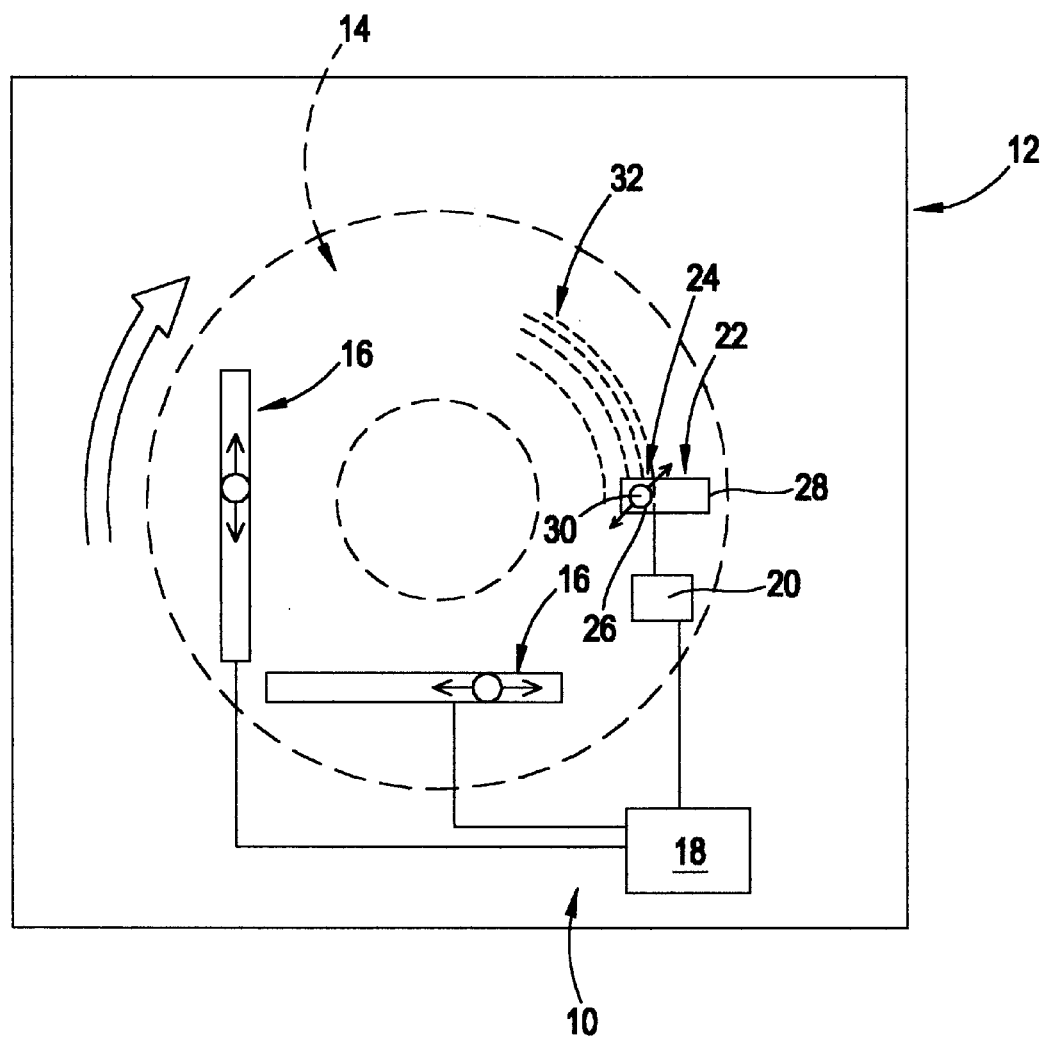
FIG. 5 is a schematic diagram of the balance control system of FIGS. 1–4 illustrating actuators being controlled based on what was learned by floating the data head as shown in FIGS. 1–4.

If the data storage apparatus 12 is a CD-ROM drive, the data storage apparatus 12 includes a chuck and spindle assembly (not shown) or some other appropriate means to hold and rotate the data storage medium 14. The balance control system 10 includes at least one balancing actuator 16 contactable with the rotating data storage medium 14. Specifically, preferably the balance control system 10 includes two weighted linear actuators 16 that are positioned perpendicular to one another and are operated generally in, or parallel to, the plane of the rotating data storage medium 14. The actuators 16 are preferably driven, as shown in FIG. 5, with magnitude and phase in opposition to any periodic vibrations resulting from rotating the data storage medium 14, as will be explained more fully later herein. Ideally, the actuators 16 cancel the vibrations to permit a higher storage density media to be used and/or data to be read from or written to the data storage medium 14 without incurring damage to any component of the data storage apparatus 12. Although the drawings depict two actuators 16 for influencing the rotation of the data storage medium 14 in two dimensions, it will become evident that more actuators may be provided to influence the rotation of the data storage medium 14 in the third dimension should vibrations in the third dimension be predicted using, for example, other aspects of the present invention to do so as will become apparent.

In communicative connection to the actuators 16 is a processor 18. The processor 18 can communicate to the actuators 16 via the connection, and therefore can control the actuators 16, including the phase and magnitude of their movement. The processor 18 is also communicatively connected to control circuitry 20 which is communicatively connected to a tracking mechanism 22. The processor 18 of the present invention need not be actually a "processor" as this term is usually used in the art, but may be essentially any structure that is capable of deriving information from information as will be described. It should also be noted that there may very well be several additional components of the data storage apparatus 12 which are not shown herein, some of which may be between, for example, the actuators 16 and the processor 18, or between other components which are depicted and/or described herein.

Within the balance control system 10, the tracking mechanism 22 may comprise a conventional head and sled assembly 24 whereby a data head 26 is conveyed by a moveable sled 28. The data head 26 can emit a laser light beam 30, and direct same to the data storage medium 14 thereby enabling the data head 26 to detect data tracks 32 on the data storage medium 14 and read data therefrom and/or write data thereto. The control circuitry 20, via the connection with the tracking mechanism 22, can count the data tracks 32 which the data head 26 detects, and can communicate information relating thereto to the processor 18.

Subsequently, the processor 18 can derive balancing actuator direction information from that which is received from the control circuitry 20, and can communicate the derived balancing actuator direction information to the actuators 16 thereby directing the control thereof and dictating in what particular manner the effects of the unbalance of a rotating data storage disc 18 is to be altered or influenced.

It is preferable to implement the balance control system 10 of the present invention as a feedforward control system or as a neural network whereby several data storage media are rotated and vibrations resulting from the rotation of the data storage media are detected in order to learn the characteristics of the rotational imbalance of rotating data storage media (the learning phase). Subsequently, the rotation of a data storage medium 14 is controlled based on the characteristics learned during the learning phase (the control phase). In other words, the vibrations are essentially "predicted" and the actuators 16 functioned in anticipation thereof Additionally, the balance control system 10 in accordance with the present invention shown in FIGS. 1–5 can be utilized as a feedback control system (essentially, a second neural net) to fine tune control of the rotation of the data storage medium 14 whereby data tracks 32 being detected by the tracking mechanism 22 are used to operate the actuators 16 while data is read from the data storage medium 14.

Implementation of the balance control system 10 during the learning phase will now be described in connection with a single data storage medium 14 with the understanding that it is preferred that the balance control system 10 be initially used with several rotating data storage media during the learning phase. Preferably, a balancing sequence is initiated upon start-up of the data storage apparatus 12 when a new data storage medium 14 is inserted therein, or is initiated when a significant change in rotational speed of the data storage medium 14 has occurred such as in a Constant Linear Velocity (CLV) system. The balancing sequence may be such where initially the data storage medium 14 is rotated at a relatively slow rate of speed while the data head 26 is held static. As the data storage medium 14 is rotated, the data head 26 directs a laser light beam 30 to the data storage medium 14 and detects the magnitude of data tracks 32 oscillating across the data head 26. The data tracks 32 oscillate across the data head 26 even though the data storage medium 14 is rotating slowly because of the data storage medium 14 being chucked off-center or because the data tracks 32 were elliptically embedded on the data storage medium 14. The control circuitry 20 in communication with the tracking mechanism 22 contains circuits to count data track 32 crossings by the data head 26, thereby allowing for the measurement of the mis-chucking of the data storage medium 14 by the processor 18.

Figure 2:
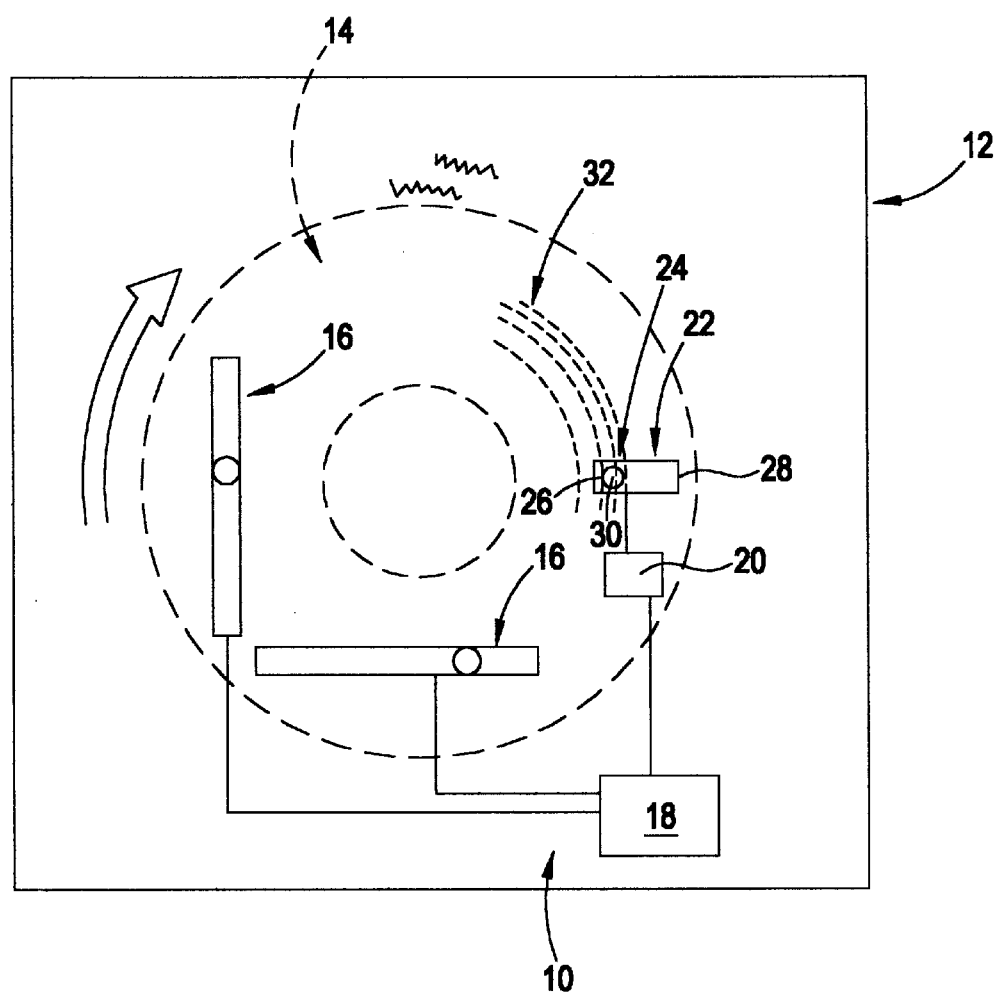
Figure 3:
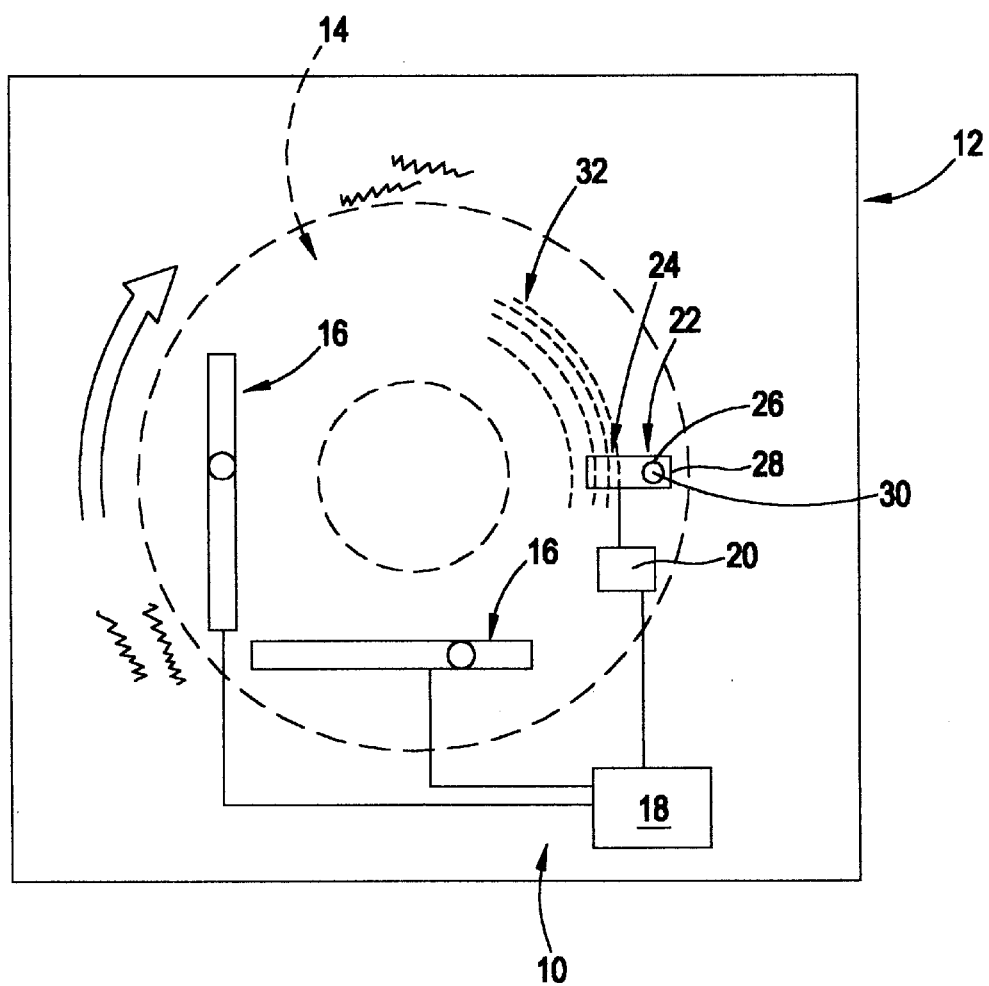

Then, the rate of rotation of the data storage medium 14 is increased until it reaches a pre-determined, operating rotational speed. As shown in FIG. 1, while rotating the data storage medium substantially at the pre-determined rotational speed, the tracking mechanism 22 is positioned at a certain location with regard to the rotating data storage medium 14, and the data head 26 is left undriven. The data head 26 is undriven in that the data head is not directed, such as magnetically, to a certain position in the sled 28. Because vibrations (shown in FIGS. 1–4, 7–10, 12–16, 19–21 and 23 as "wiggle" lines adjacent the circumference of the rotating data storage medium 14) resulting from the rotating data storage medium 14 are mechanically transferred (or "coupled") to the tracking mechanism 22 and the data head 26 is undriven, the data head 26 floats or oscillates along the sled 28 in response to rotational imbalance of the rotating data storage medium 14. The progressions from FIG. 1 to FIG. 2 and from FIG. 2 to FIG. 3 depict this floating or oscillation of the data head 26. As the data head 26 floats or oscillates in the sled 28 in response to rotational imbalance of the rotating data storage medium 14, the data head 26 directs the laser light beam 30 to the data storage medium 14. Therefore, the data head 26 can detect data tracks 32 on the data storage medium 14 as the data head 26 floats and oscillates with the vibrations.

Figure 4:
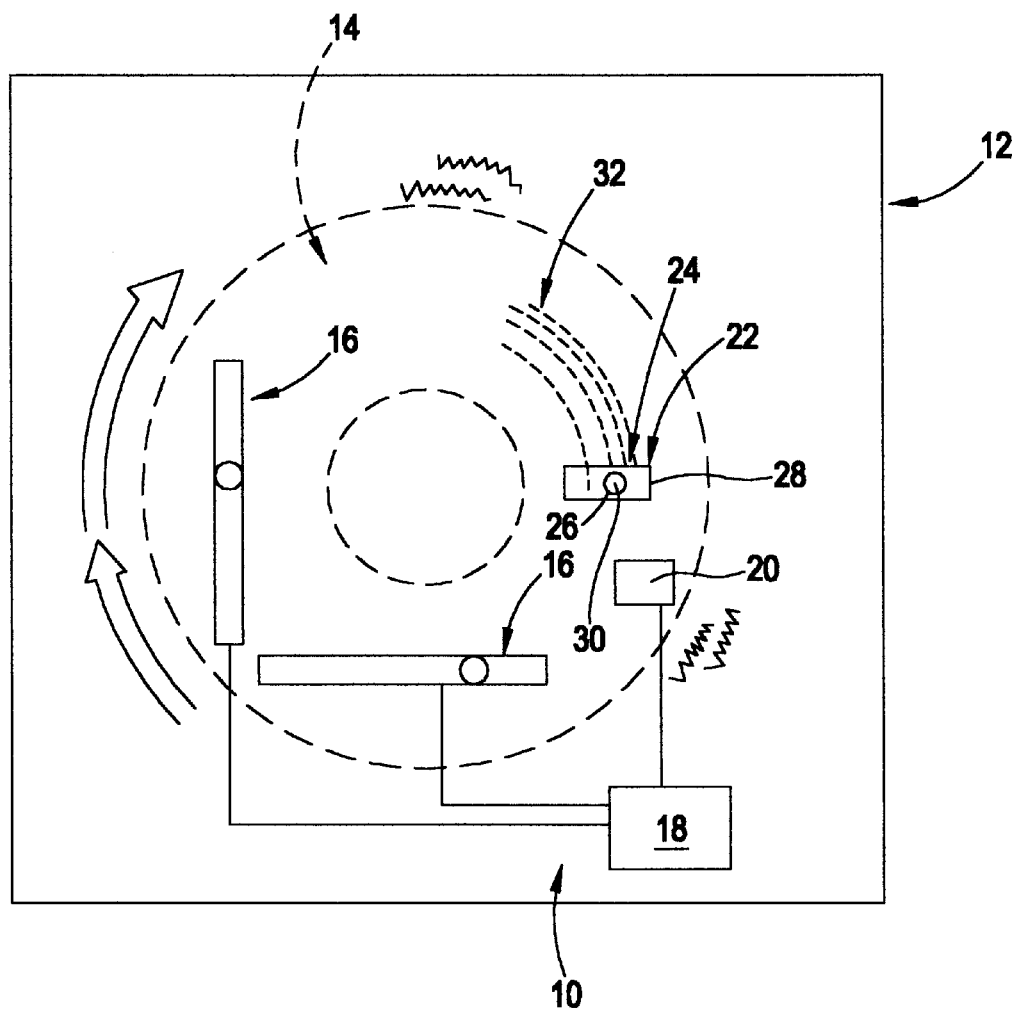
FIG. 4 is a schematic diagram of the balance control system of FIGS. 1–3 illustrating the data storage medium rotating at a different speed by using two arrows and illustrating a sled of a tracking mechanism at a different position than that which is shown in FIGS. 1–3.

The control circuitry 20 in communication with the tracking mechanism 22 contains circuits to count data track 32 crossings by the floating, oscillating data head 26, thereby allowing for the measurement of the velocity and magnitude of the oscillation by the processor 18. The processor 18 essentially uses the data tracks 32 on the data storage medium 14 detected by the floating data head 26 as a scale to determine the range of oscillation dependent on the mass of the data head 26. While the data head 26 can only be used to actually physically measure the magnitude and period of vibration in the direction in which the data head is floatable, these values can be transposed to a direction perpendicular thereto with the phase offset by ninety degrees. Hence, the processor 18 uses the tracking mechanism 22 as an inertial sensor to sense the total vibration of the data storage apparatus 12 in the general rotational plane of the data storage medium 14. The processor 18, by subtracting the magnitude of data tracks 32 detected while rotating the data storage medium 14 at a slow rate of speed while holding the data head 26 static from the magnitude of data tracks 32 detected while rotating the data storage medium 14 at an operational speed of rotation, can calculate the vibrations induced generally in the plane of the data storage medium 14 as a result of rotating the data storage medium 14. After a certain period of time or after the processor 18 has acquired a certain amount of information with regard to the rotational imbalance of the data storage medium 14, the sled 28 can be moved to a different location and/or the speed of rotation of the data storage medium 14 can be changed as shown in FIG. 4, and the data head 26 allowed to float or oscillate again as more information regarding the rotational imbalance of the data storage medium 14 is acquired. This process may be repeated as necessary for the processor 18 to adequately "learn" the characteristics of the rotational imbalance of the data storage medium 14. Specifically, FIG. 4 shows the rotational speed of the data storage medium 14 having been increased, and the sled 28 having been moved radially inward to allow the data head 26 to float again. This entire process is repeated in connection with several data storage media (the learning set).

After the learning phase is complete (during which the above-described process is repeated in connection with several data storage media), then, as shown in FIG. 5, a control phase can be initiated wherein a data storage medium 14 can be rotated at a certain rotational speed, and the tracking mechanism 22 can be moved to a desired data track 32 on the data storage medium 14 to read data therefrom. To this end, the data head 26 directs the laser light beam 30 to the data storage medium 14. As data is read, the processor 18 uses what was previously "learned" regarding the rotational imbalance of data storage media during the learning phase to control the actuators 16 to counter-act anticipated vibrations resulting from the rotation of the data storage medium 14. Ideally, that which was learned by the processor 18 regarding the rotational imbalance of data storage media during the learning phase is used by the processor 18 to control the actuators 16 in order to successfully counter-act the vibrations which result from rotating the data storage medium 14 (shown in FIG. 5 by omitting any "wiggle" lines adjacent the circumference of the rotating data storage medium 14) during the control phase so that the vibration at the data head 26 is reduced, and is preferably zero, or at least nominal, as a result. Additionally, the processor 18 also uses what was previously "learned" regarding mis-chucking to control movement of the tracking mechanism 22 in a direction generally perpendicular to the data storage medium 14 (using, for example, a focus actuator). Because the processor 18 preferably obtains information relating to the rotational imbalance of data storage media at a plurality of different speeds during the learning phase, the balance control system 10 can adapt to different speeds of rotation when data is subsequently read from and/or written to a data storage medium 14 during the control phase. Moreover, because the learning phase is employed with several different data storage media, such as with several different data storage discs (e.g. CD-ROM discs), the balance control system 10 can adapt to different storage discs and across time, and can respond accordingly by controlling the actuators 16 in an effective manner to cancel vibrations during the control phase.

Figure 6:
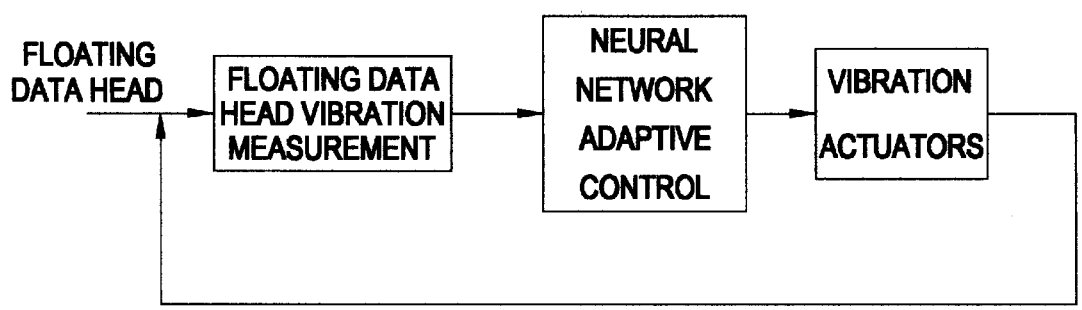
FIG. 6 is a block diagram showing the general underlying concept behind the balance control system of FIGS. 1–5.

In short, the balance control system 10 is essentially a neural network which operates as an adaptive computational engine for control. Specifically, the balance control system 10 utilizes detected vibrations resulting from the rotation of data storage media to learn the characteristics of the rotational imbalance of rotating data storage media (learning phase) and subsequently controls the rotation of a data storage medium based on the characteristics learned (control phase). The general underlying concept of the balance control system 10 is depicted in FIG. 6 as a block diagram.

In addition to, or as an alternative to, learning the rotational imbalance of data storage media during the learning phase to subsequently counter-act same while reading data from and/or writing data to a data storage medium during the control phase, that which was learned by the processor 18 regarding the resulting vibrations during the learning phase can be used with other sub-systems to reduce the vibrations, or the extent of the oscillation of the data head 26 can be used to determine whether the data storage apparatus 12 will generally be at risk of damage if the data storage medium 14 continues to rotate. In response, the data storage apparatus 12 can stop rotating the data storage medium 14 and refrain from subsequently starting to rotate same. In this manner, the balance control system 10 of the present invention can be used to protect a data storage apparatus 12 from being subjected to excessive vibrations as a result of attempting to read data from and/or write data to a data storage medium 14. For example, a CD-ROM disc may be warped or have some other characteristic which may damage a data storage apparatus 12. By using the balance control system 10 in accordance with the present invention to first learn the characteristics of the rotational imbalance of CD-ROM discs before attempting to read data from or write data to a CD-ROM disc, damage to the data storage apparatus 12 can be prevented.

The other embodiments of the present invention are quite similar to the balance control system 10 depicted in FIGS. 1–5 which was just described. In fact, the differences between the embodiments involve what exactly is monitored to learn the rotational imbalance characteristics of data storage media during the learning phase and what exactly is performed to attempt to subsequently accommodate the vibrations resulting from rotating a data storage medium during the control phase. Therefore, with regard to the other embodiments, identical reference numerals are used for identical parts and discussion relating thereto is omitted with the understanding that one can refer to the above discussion relating to the balance control system 10 depicted in FIGS. 1–5 to gain an understanding thereof.

Figure 7:
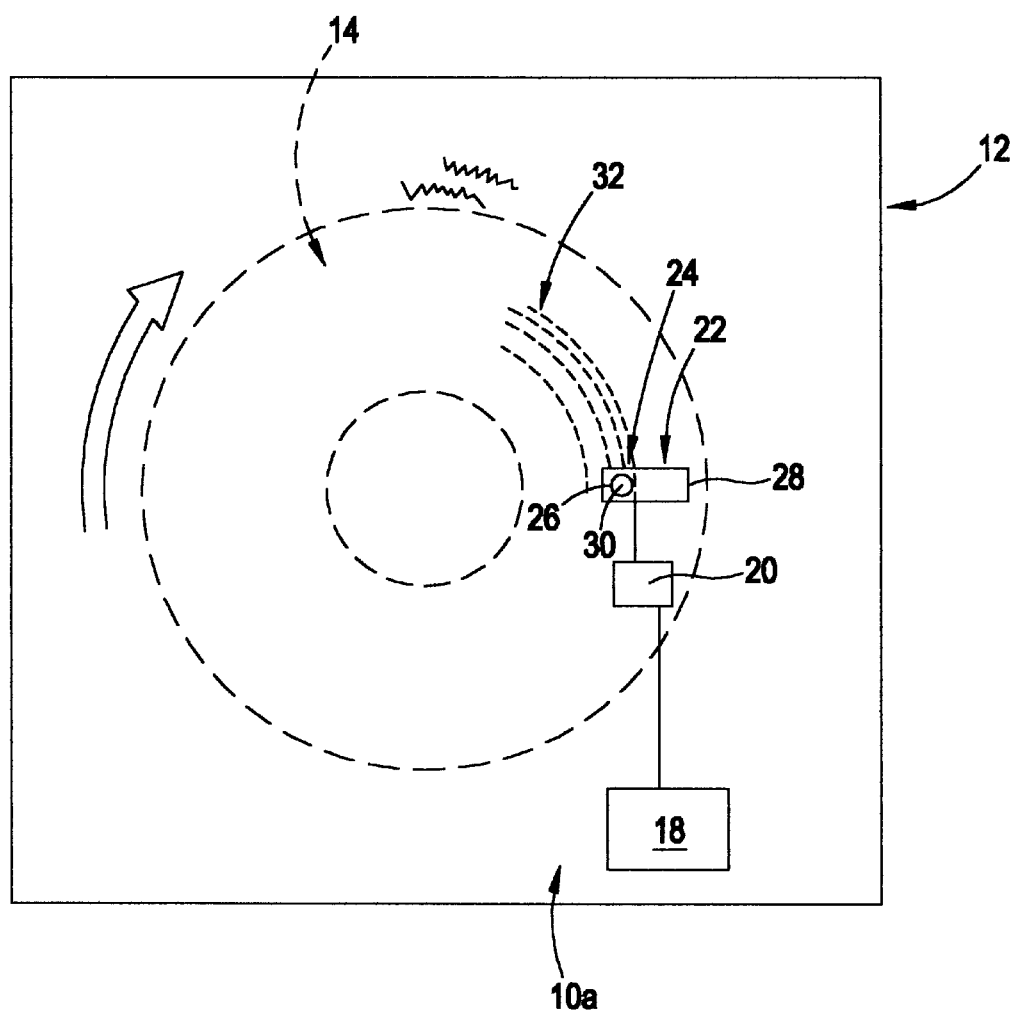
FIGS. 7 and 8 are schematic diagrams of a tracking mechanism control system illustrating with an arrow a data storage medium rotating and illustrating with "wiggle" lines vibrations resulting therefrom and a data head floating in response thereto.
Figure 8:
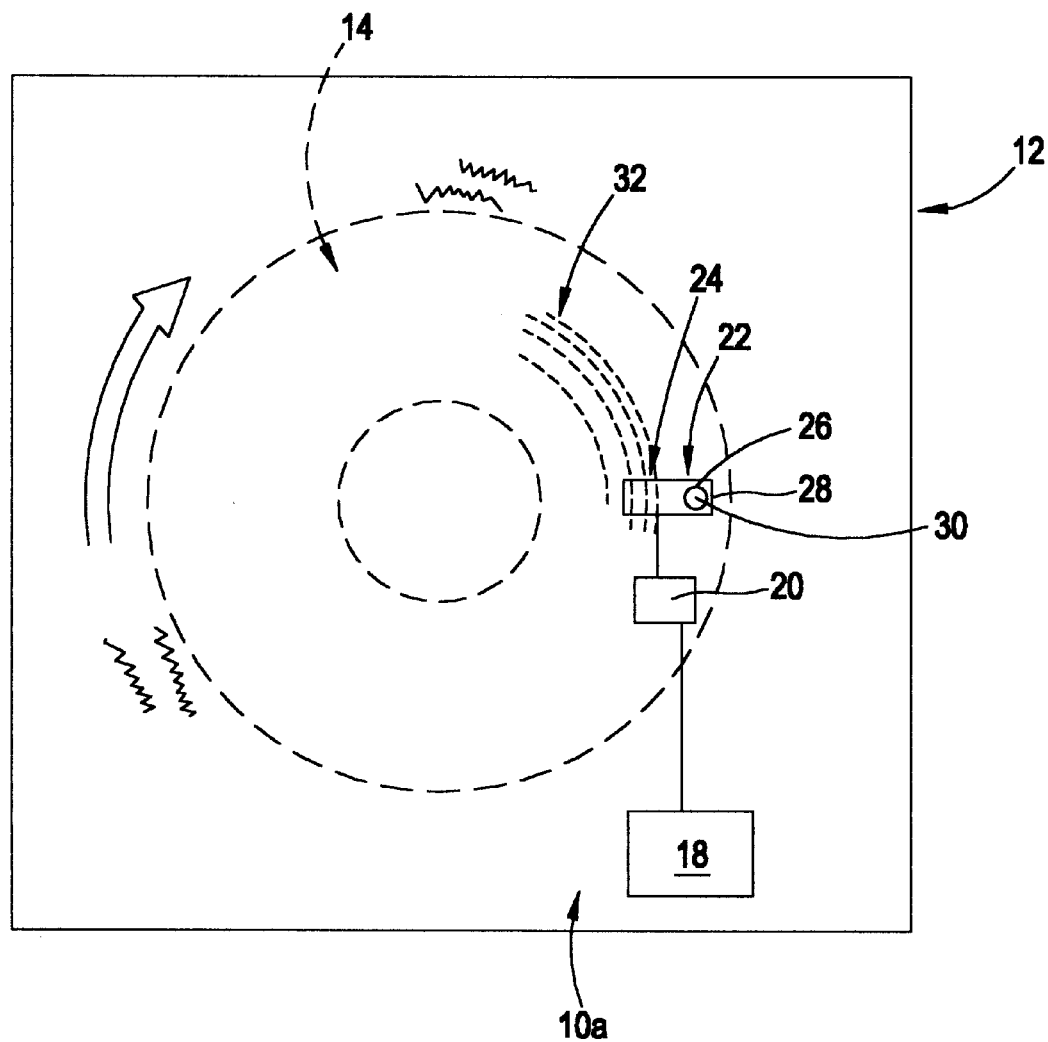
Figure 9:
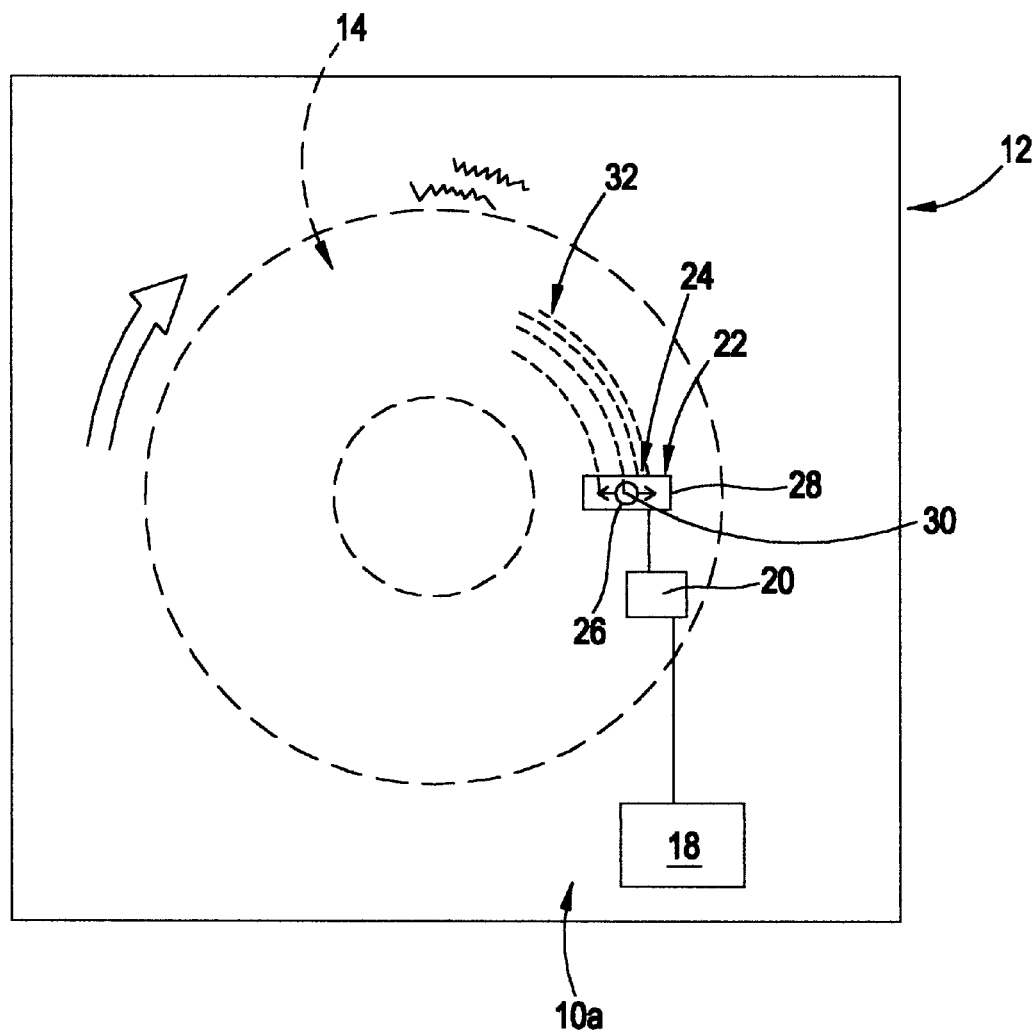
FIG. 9 is a schematic diagram of the data head movement control system of FIGS. 7 and 8 illustrating a data head being moved based on what was learned by floating the data head as shown in FIGS. 7 and 8.
Figure 11:
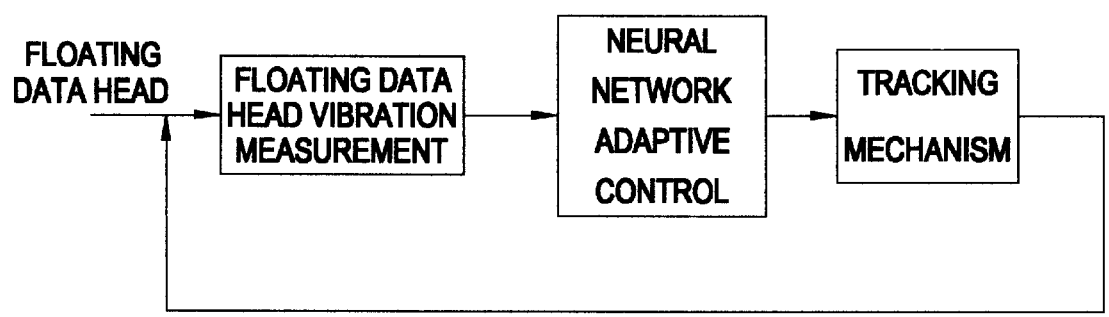
FIG. 11 is a block diagram illustrating the general underlying concept behind the data head movement control system of FIGS. 7–10.

The data head movement control system 10a shown in FIGS. 7–9 is very similar to the balance control system 10 shown in FIGS. 1–5. In fact, almost all aspects and functioning of the data head movement control system 10a shown in FIGS. 7–9 are the same as the balance control system 10 shown in FIGS. 1–5. Like the balance control system 10 shown in FIGS. 1–5, the data head movement control system 10a shown in FIGS. 7–9 also includes a tracking mechanism 22 in communication with control circuitry 20 so that the control circuitry 20 can count data tracks 32 detected by a floating data head 26 (FIGS. 7 and 8 show the data head 26 floating). Additionally, the data head movement control system 10a uses the floating data head 26 to learn the rotational imbalance characteristics of data storage media during the learning phase. However, instead of including actuators 16 for influencing the rotation of a data storage medium 14 during the control phase based on what was learned during the learning phase, the data head movement control system 10a provides that the processor 18 derives data head movement direction information from the information received from allowing the data head 26 to float or oscillate as data storage media are rotated during the learning phase. Thereafter, as shown in FIG. 9, when data is read and/or written to a data storage medium 14 during the control phase, the processor 18 can dictate the control of movement of the tracking mechanism 22 to accurately follow the desired data track 32 based on what the processor 18 had previously "learned" during the learning phase regarding the rotational imbalance of data storage media as well as what the processor 18 learned about mis-chucking (The data head 26 effectively may also be allowed to float in a directionally generally perpendicular to the data storage medium by, for example, allowing a focus actuator to float during the learning phase. Then, the focus actuator may be controlled during the control phase based on what was learned). Therefore, the tracking error and focus error, possibly is reduced and is preferably zero, or at least nominal, as a result. The general underlying concept of the data head movement control system 10a is depicted in FIG. 11 as a block diagram.

Figure 10:
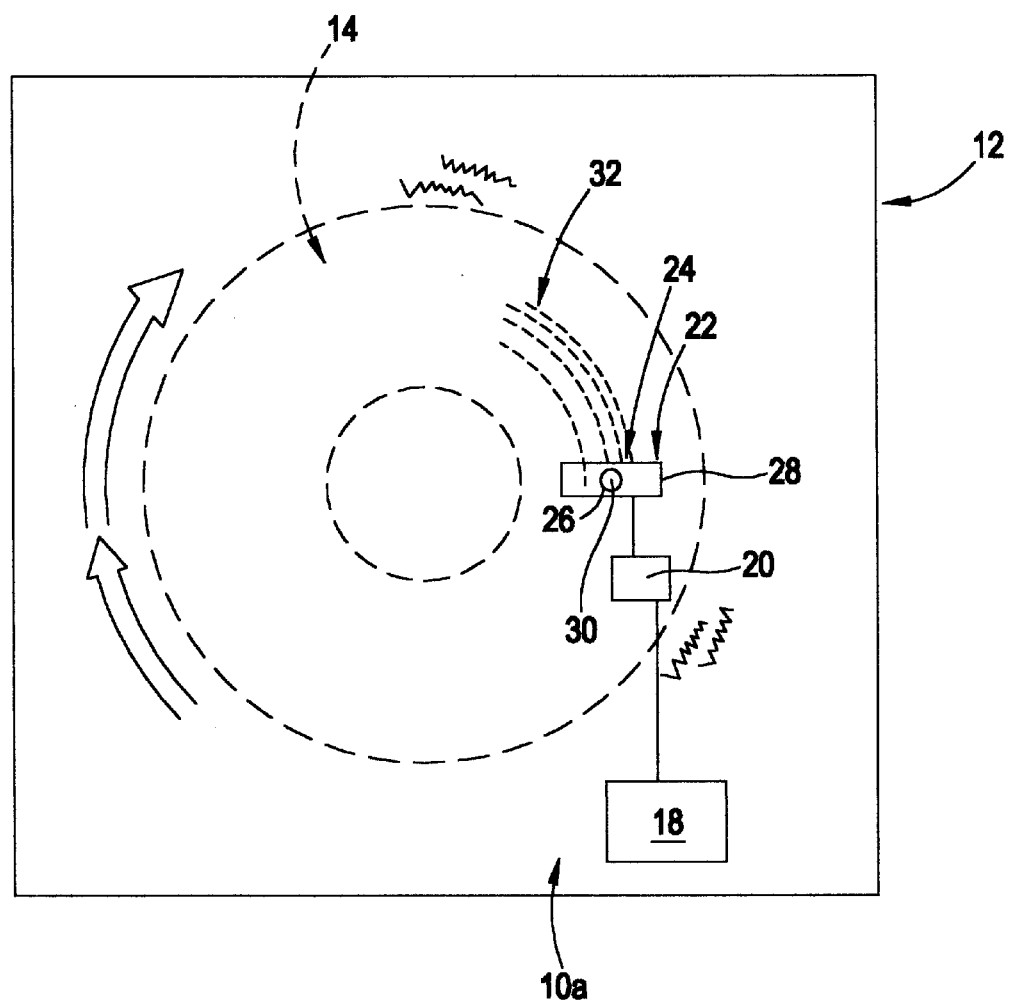
FIG. 10 is a schematic diagram of the data head movement control system of FIGS. 7–9 illustrating with arrows the data storage medium rotating at a different speed and a sled of the tracking mechanism at a different position than that which is shown in FIGS. 7–9.

In other words, the data head movement control system 10a is essentially a neural network which utilizes detected vibrations resulting from the rotation of data storage media to learn the characteristics of the rotational imbalance of rotating data storage media (the learning phase) and subsequently controls, during the control phase, the movement of a data head tracking mechanism (and possibly also the focus mechanism) based on the characteristics which have been previously learned. Of course, the data head movement control system 10a can be used in association with a balancing sequence much like that which was already described with regard to the balance control system 10 shown in FIGS. 1–5, and can be used within essentially the same methods as already described above in relation to the balance control system 10 including allowing the data head 26 to float at different speeds of rotation and different positions of the sled 28, as shown in FIG. 10.

Figure 12:
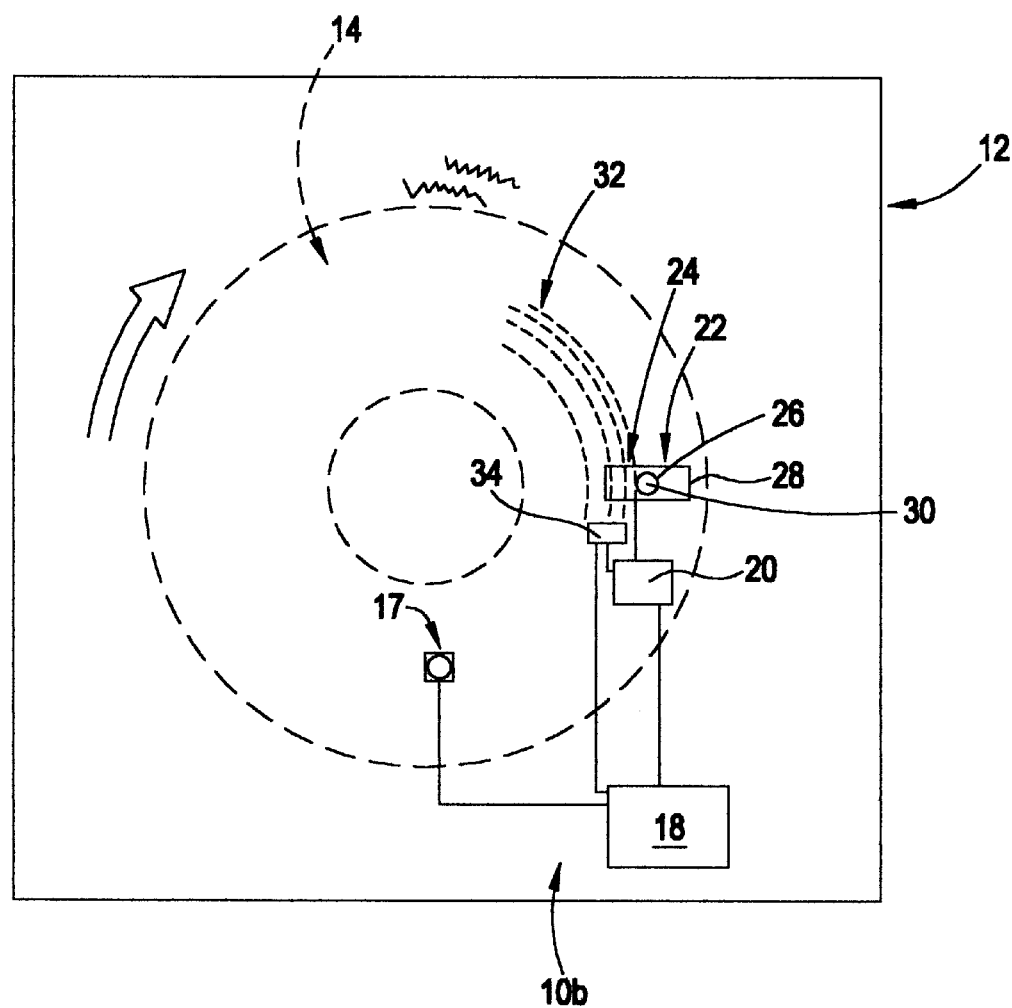
FIG. 12 is a schematic diagram of a balance control system illustrating a data storage medium rotating and a detector detecting a laser light beam being directed at the rotating data storage medium.
Figure 13:
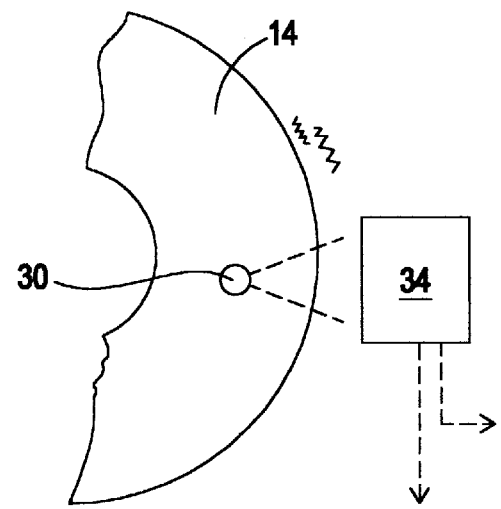
FIGS. 13–15 are schematic diagrams illustrating the changing shape of the laser light beam directed on the data storage medium as shown in FIG. 12.
Figure 14:
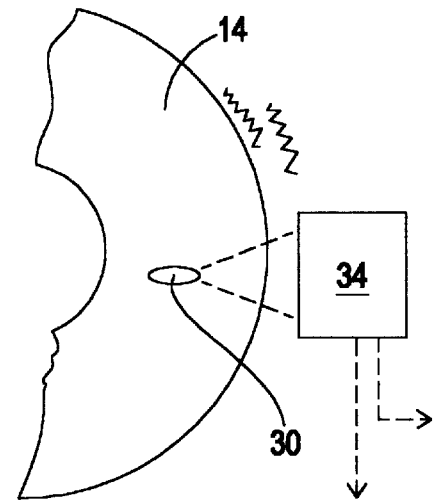
Figure 15:
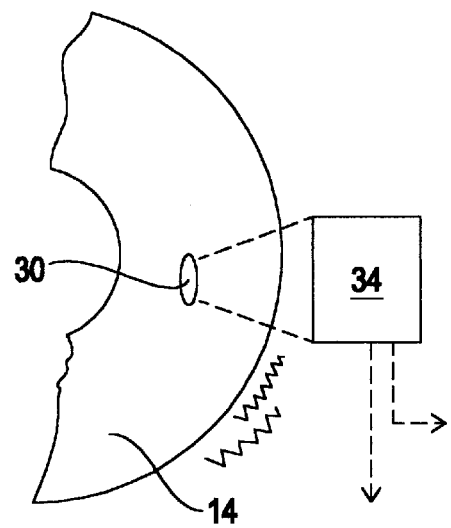
Figure 16:
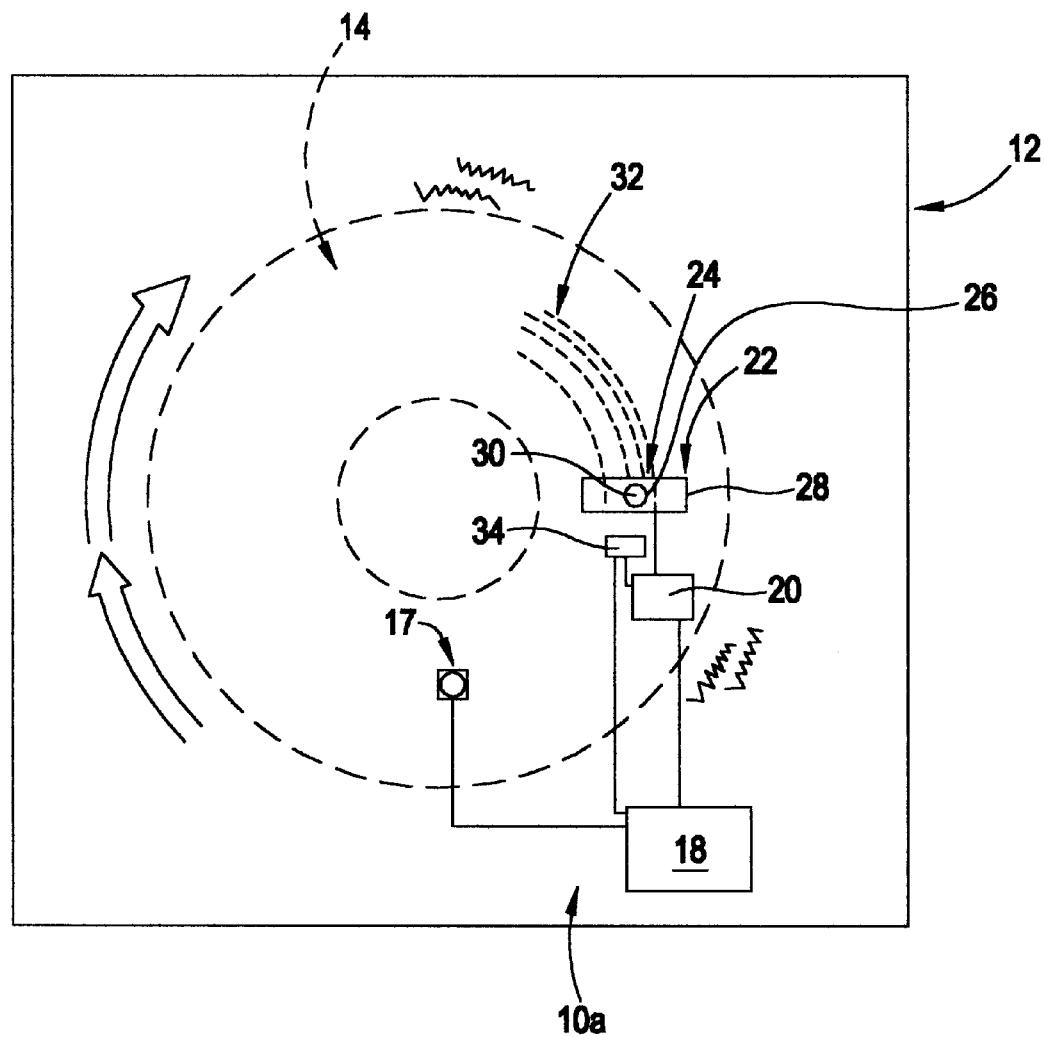
FIG. 16 is a schematic diagram of the balance control system of FIG. 12 illustrating the data storage medium rotating at a different speed by using two arrows and illustrating a sled of a tracking mechanism at a different position than that which is shown in FIG. 12.
Figure 17:
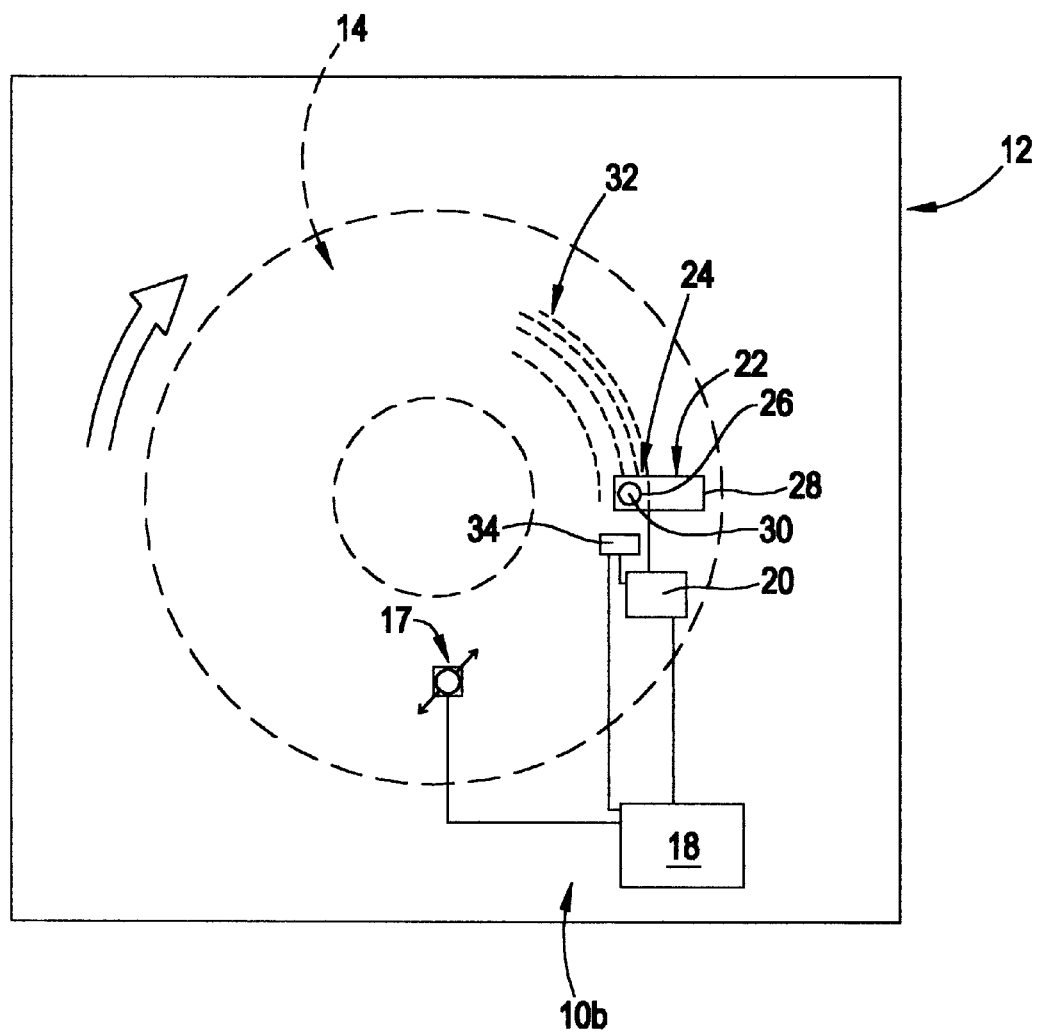
FIG. 17 is a schematic diagram of the balance control system of FIGS. 12 and 16 illustrating an actuator being controlled based on what was learned by detecting the laser light beam as shown in FIGS. 12–16.

The balance control system 10b shown in FIGS. 12, 16 and 17 is very similar to the balance control system 10 shown in FIGS. 1–5 and may be used in combination therewith. The balance control system 10b includes a detector 34 for detecting the laser light beam 30 directed to a data storage medium 14 by a driven data head 26 of the tracking mechanism 22, and includes a balance actuator 17 movable in a direction perpendicular to the general plane of the data storage medium 14. Preferably, the detector 34 specifically comprises three or four diodes for optically sensing the shape of the laser light beam 30. While such a detector is somewhat conventional in the art, the detector is typically used only in association with a focus actuator (as already described) within a feedback control system to continuously adjust the distance of the data head from the rotating data storage medium in order to keep the data head focused on the data track. In contrast, the balance control system 10b according to the present invention provides that the processor 18 is in communicative connection with the detector 34 to receive information relating to the shape of the laser light beam 30 directed on the data storage medium 14 by the data head 26 and "learn" about the characteristics of the rotational imbalance of data storage media. FIG. 12 shows the tracking mechanism 22 directing a laser light beam 30 to a data storage medium 14 (preferably, the process is repeated with several data storage media) during the learning phase, and the progressions from FIG. 13 to FIG. 14 and from FIG. 14 to FIG. 15 show the detector 34 detecting the changing shape of the laser light beam 30 on the data storage medium 14 as it rotates. Therefore, the processor 18 can derive balancing actuator direction information from the information received regarding the shape of the laser light beam 30 on the data storage medium 14 and can subsequently, as shown in FIG. 17, control the actuator 17 based thereon to attempt to cancel resulting vibrations in a direction generally perpendicular to the plane of the data storage medium 14 when data is actually being read from and/or written to a data storage medium 14 during the control phase. Specifically, preferably the processor 18 of the balance control system 10b determines a range of oscillation of the data storage media based on information received regarding the shape of the laser light beam 30, and derives balancing actuator direction information for subsequently balancing a data storage medium 14 during the control phase so that the vibration at the data head 26 is reduced, and is preferably zero, or at least nominal, as a result. This is possible because the shape of the laser light beam 30 on data storage media will be dependent on the vibrations which result from rotating same, and therefore will give an indication of the rotational imbalance of the data storage media.

It should be noted that, as shown, the detector 34 may be also communicatively connected to the control circuitry 20 of the tracking mechanism 22. In fact, the detector 34 may not even be directly communicatively connected to the processor 18, and may instead be indirectly connected thereto via the communicative connection between the detector 34 and the control circuitry 20 and between the control circuitry 20 and the processor 18. As mentioned hereinbefore, the connections and components of the data storage apparatus 12 may differ somewhat from that which is discussed and depicted herein and still utilize the present invention.

Figure 18:
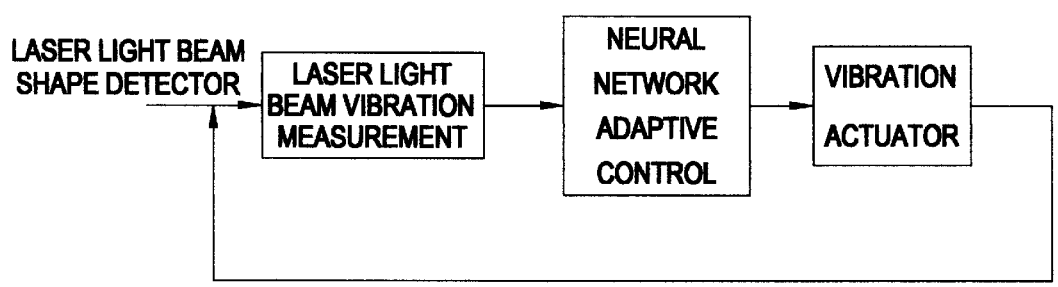
FIG. 18 is a block diagram illustrating the general underlying concept behind the balance control system of FIGS. 12, 16 and 17.

It is preferred to implement the balance control system 10b of the present invention as a feedforward control system or as a neural network whereby several data storage media are rotated and vibrations resulting from the rotation of the data storage media are detected during a learning phase in order to learn the characteristics of the rotational imbalance of the rotating data storage media. Subsequently, the rotation of a data storage medium 14 is controlled based on the characteristics learned (the control phase). In other words, the vibrations are essentially "predicted" and the actuator 17 functioned in anticipation thereof. The general underlying concept of the balance control system 10b is depicted in FIG. 18 as a block diagram.

The balance control system 10b can also be utilized as a feedback control system (essentially a second neural net) during the control phase to fine tune control of the actuator 17, whereby that which is being detected by the detector 34 regarding the shape of the laser light beam 30 is used to operate the actuator 17 while data is read from the data storage medium 14.

Of course, the balance control system 10b can be used in association with a balancing sequence much like that which was already described with regard to the balance control system 10 shown in FIGS. 1–5, and can be used within essentially the same methods as already described including detecting the shape of the laser light beam 30 on data storage media at different speeds of rotation and different positions of the sled 28, as shown in FIG. 16.

For example, during the learning phase, initially a data storage medium 14 may be rotated at a relatively slow rate of speed while the data head 26 is held static in a direction generally perpendicular to the plane of the data storage medium 14. At this time, the data head 26 directs the laser light beam 30 to the data storage medium 14 as the detector 34 detects the shape of the laser light beam reflected off of the data storage medium 14, and the processor 18 calculates the mis-chucking of the data storage medium 14. Then, the data storage medium 14 may be rotated at faster, operational speeds while the shape of the laser light beam 30 reflected off of the data storage medium 14 is detected by the detector 34 and the processor 18 calculates vibrations resulting from the rotation. This is preferably repeated for several data storage media. Then, as data is read from a data storage medium 14 during the control phase, the processor 18 may control the actuator 17 to counter-act the imbalance of the rotating data storage medium 14.

Figure 19:
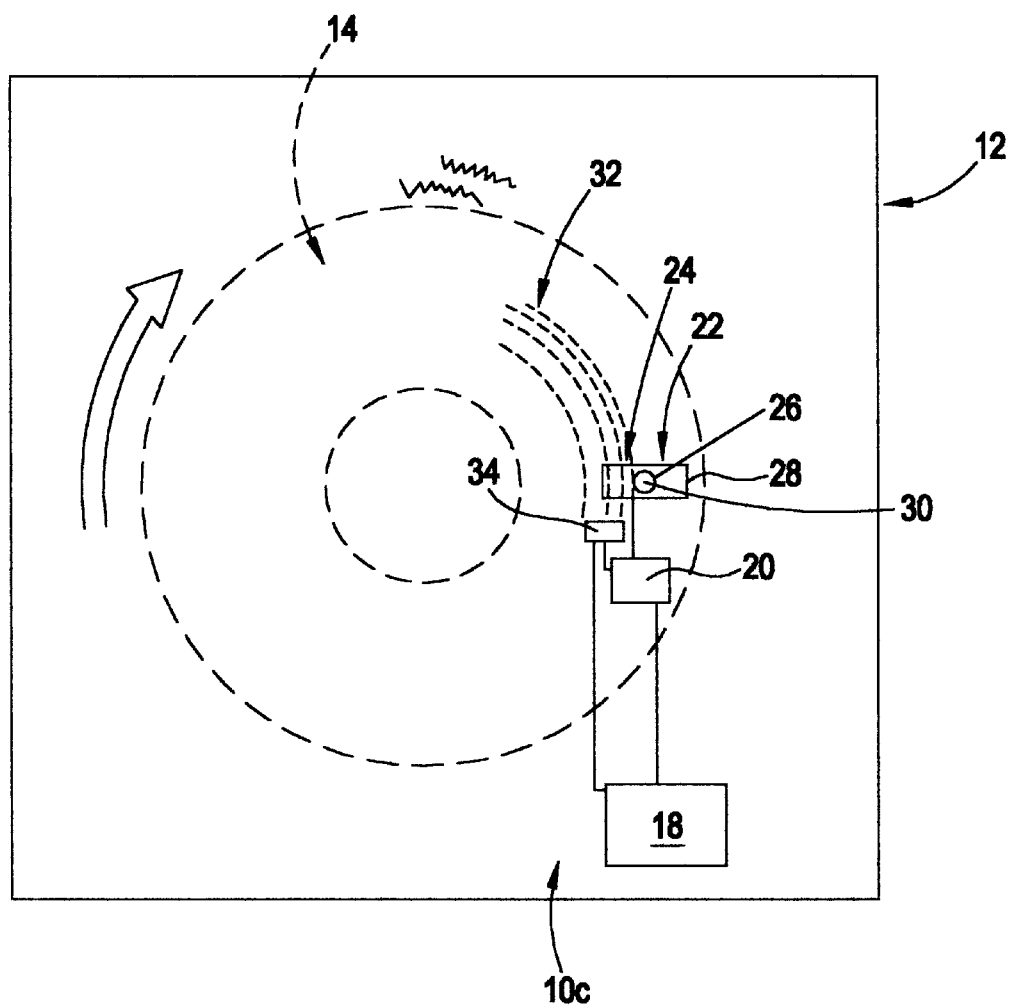
FIG. 19 is a schematic diagram of a data head movement control system illustrating with an arrow a data storage medium rotating and illustrating a detector detecting a laser light beam being directed at the rotating data storage medium.
Figure 20:
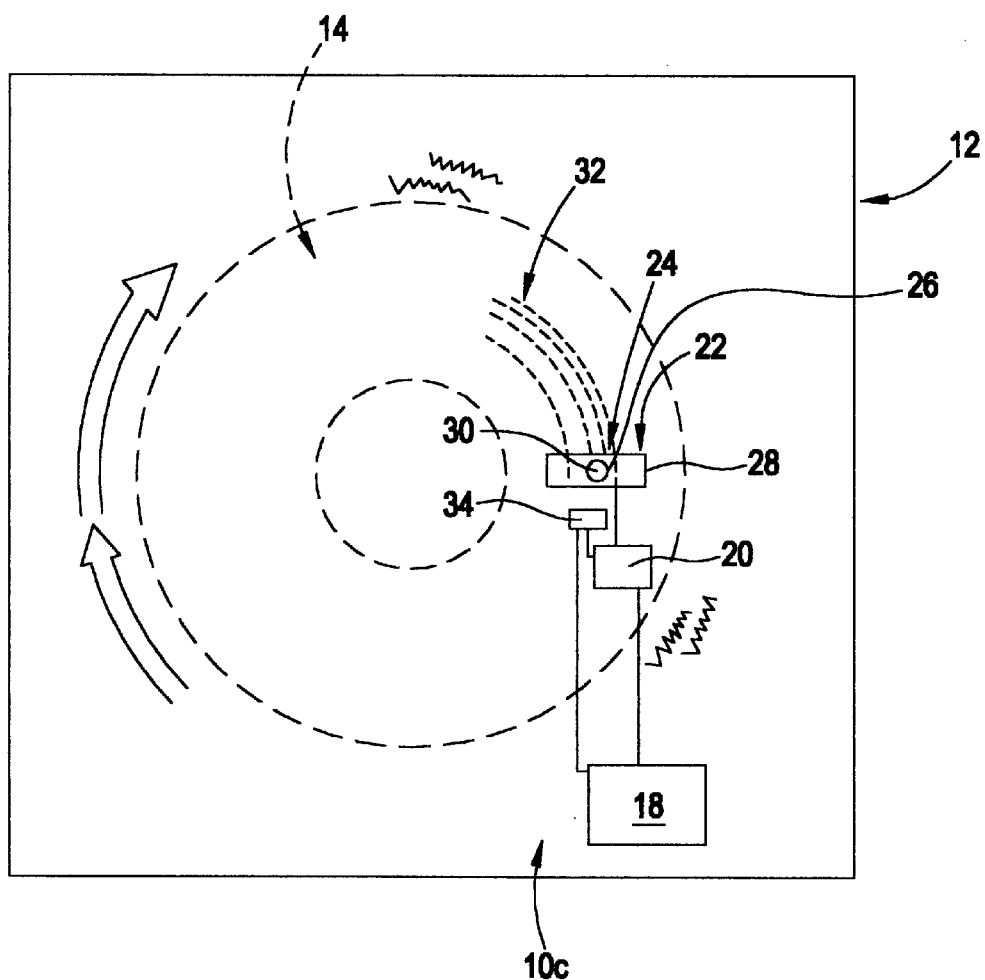
FIG. 20 is a schematic diagram of the data head movement control system of FIG. 19 illustrating the data storage medium rotating at a different speed by using two arrows and a illustrating sled of the tracking mechanism at a different position than that which is shown in FIG. 19.
Figure 21:
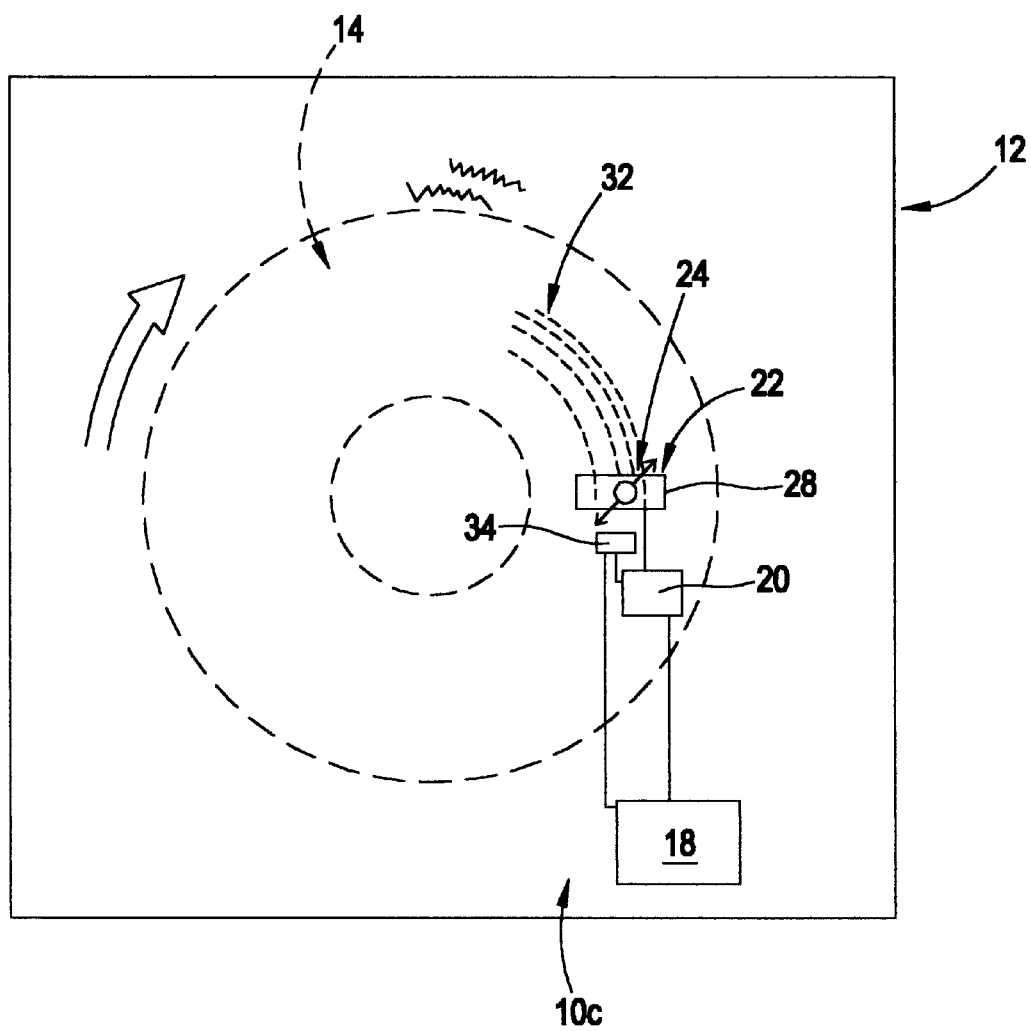
FIG. 21 is a schematic diagram of the balance control system of FIGS. 19 and 20 illustrating the data head being moved based on what was learned by detecting the laser light beam as shown in FIGS. 19 and 20 (and FIGS. 13–15)

The data head movement control system 10c shown in FIGS. 19–21 is much like the balance control system 10b of FIGS. 12, 16 and 17 in that the data head movement control system 10c also provides that a detector 34 is in communicative connection with a processor 18 so that the processor 18 can receive information from the detector 34 relating to the shape of the laser light beam 30 directed on data storage media by the data head 26 and can "learn" about the characteristics of the rotational imbalance of data storage media. FIG. 19 shows the data head 26 directing the laser light beam 30 at the data storage apparatus 14 while the detector 34 detects the shape thereof. Therefore, FIGS. 13–15 are also applicable to the data head movement control system 10c. However, while the balance control system 10b of FIGS. 12, 16 and 17 provides that the processor 18 can thereafter derive balancing actuator direction information based on the information received regarding the shape of the laser light beam 30 on data storage media and can subsequently control the actuator 17 based thereon when data is actually being read from and/or written to a data storage medium 14 during the control phase, the data head movement control system 10c shown in FIG. 19–21 provides that the processor 18 instead derives data head movement direction information, and can thereafter control movement of the data head 26, in a direction perpendicular to the plane generally defined by the data storage medium 14 (such as by using a focus actuator), while data is being read from and/or written to a data storage medium 14 as shown in FIG. 21.

Figure 22:
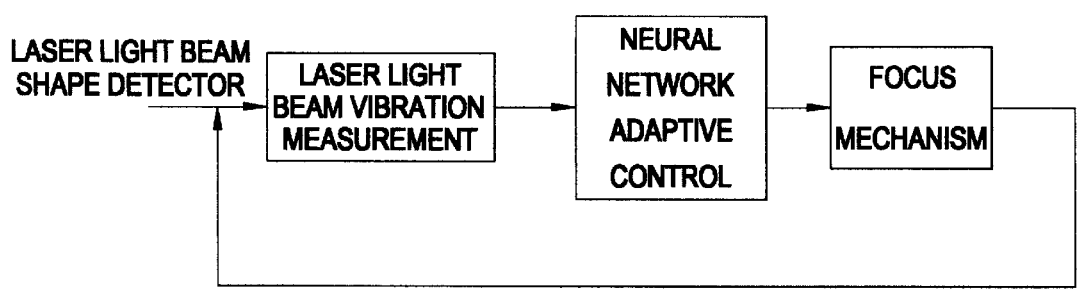
FIG. 22 is a block diagram illustrating the general underlying concept behind the balance control system of FIGS. 19–21.

Preferably, the data head movement control system 10c is utilized as a feedforward control system or as a neural network whereby the several data storage media are rotated and vibrations resulting from the rotation are detected in order to learn the characteristics of the rotational imbalance of rotating data storage media (the learning phase). Subsequently, movement of the data head 26, in a direction generally perpendicular to the plane of a data storage medium 14, is controlled based on the characteristics learned during the control phase. In other words, the vibrations are essentially "predicted" and the data head 26 moved in anticipation thereof. The general underlying concept of the data head movement control system 10c is depicted in FIG. 22 as a block diagram.

Of course, as with all the other embodiments, the data head movement control system 10c can be utilized within the balancing sequence and other methods already described including detecting the shape of the laser light beam 30 on data storage media at different speeds of rotation and different positions of the sled 28, as shown in FIG. 21.

Figure 23:
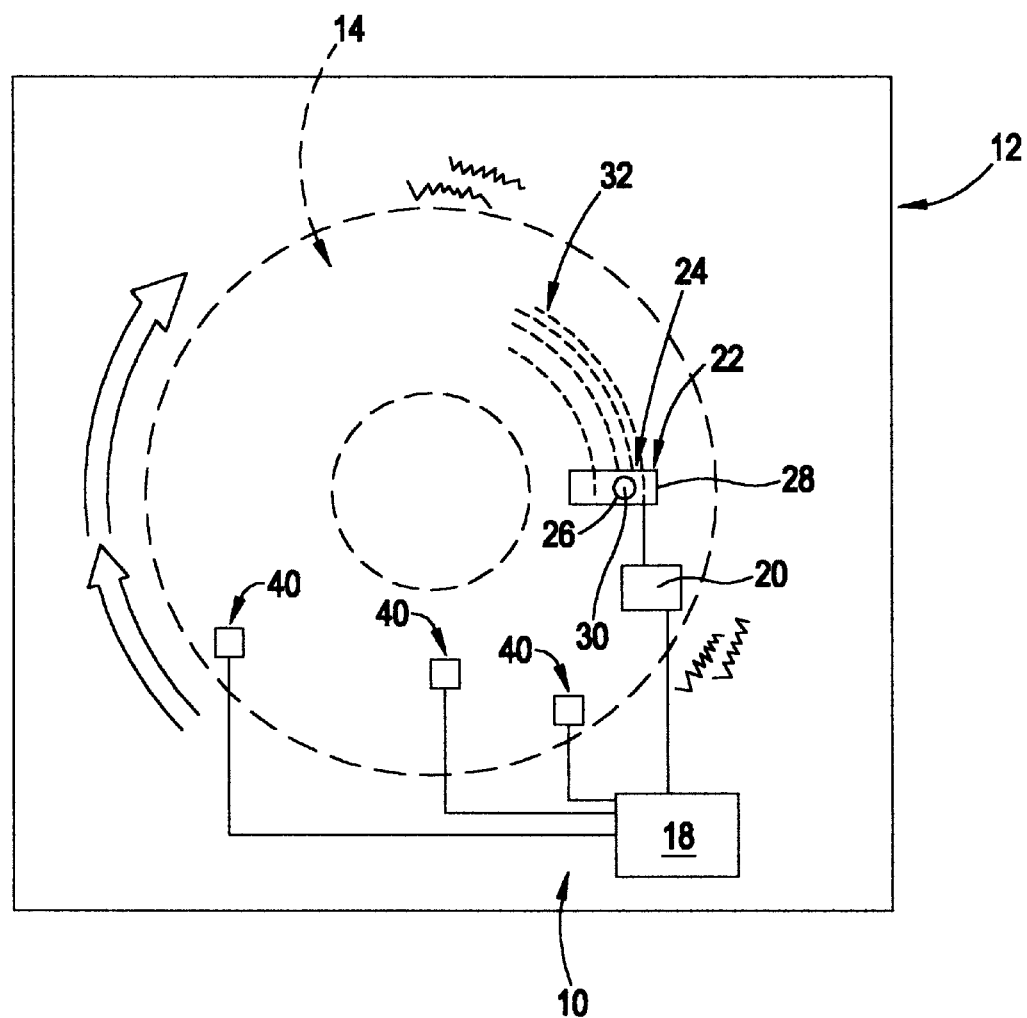
FIG. 23 is a schematic diagram illustrating with an arrow a data storage medium rotating and illustrating with "wiggle" lines vibrations resulting therefrom and vibration detecting devices detecting the vibrations.
Figure 24:
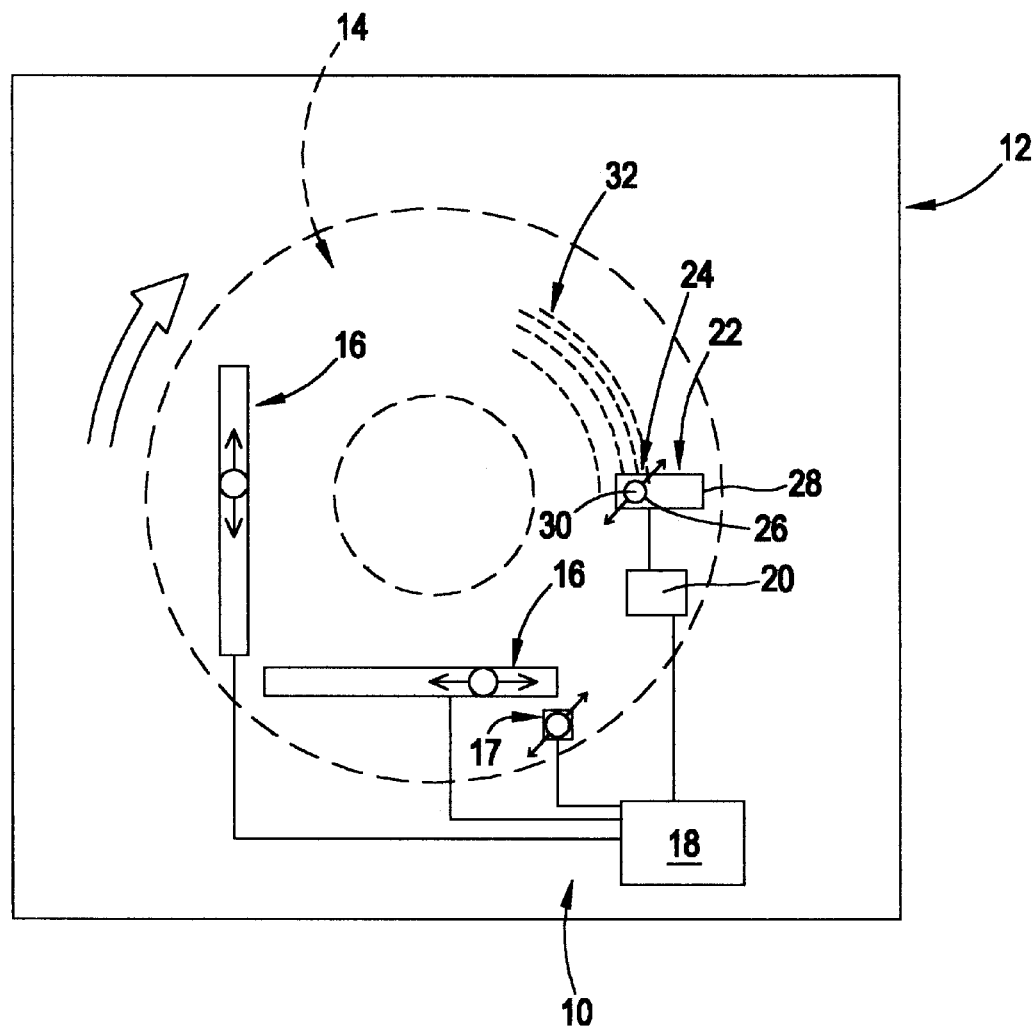
FIG. 24 is a schematic diagram illustrating actuators being controlled based on what was learned using the vibration detecting devices illustrated in FIG. 23.
Figure 25:
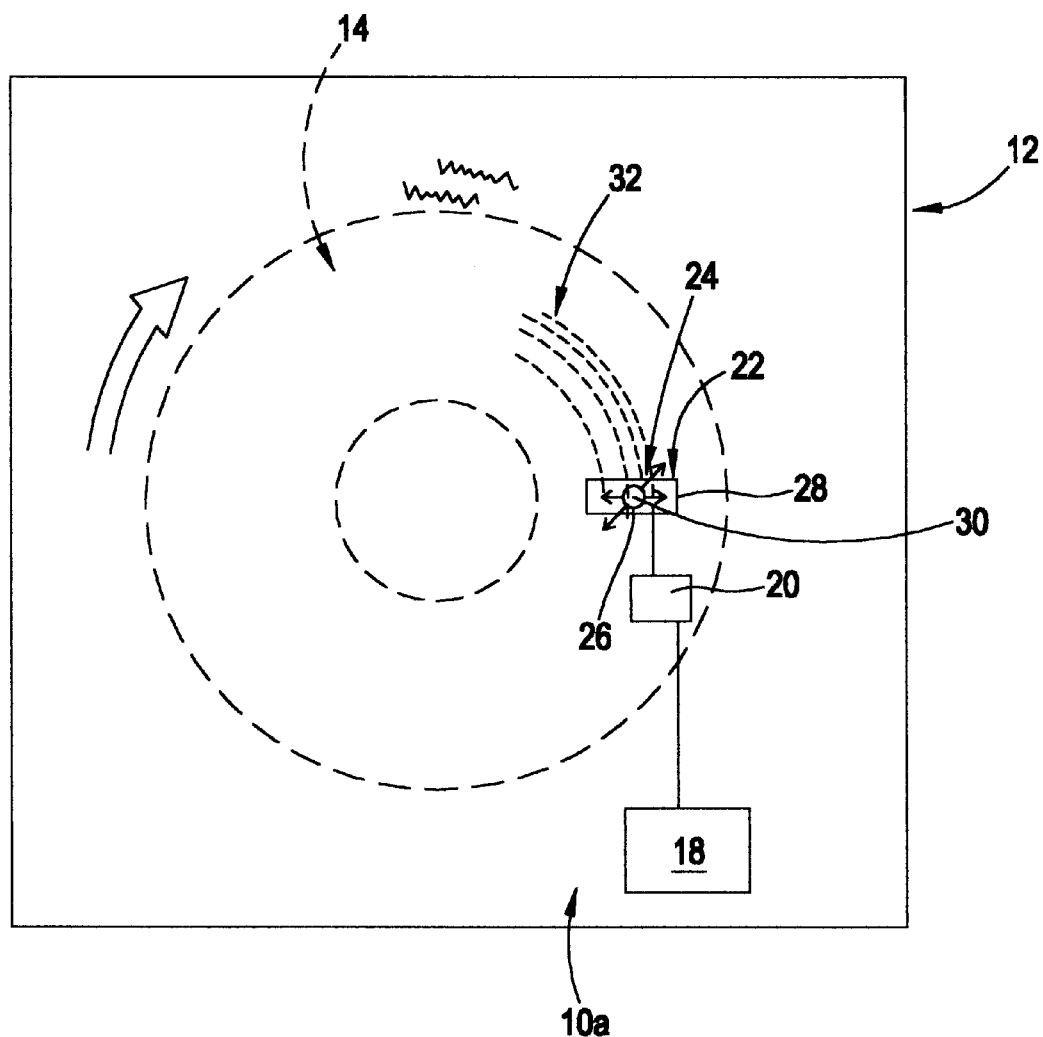
FIG. 25 is a schematic diagram illustrating a data head being moved based on what was learned using the vibration detecting devices illustrated in FIG. 23.

FIGS. 23 and 24 illustrate yet another balance control system 10d while FIGS. 23 and 25 illustrate another data head movement control system 10e. Both systems 10d and 10e provide that rotational imbalance characteristics of rotating data storage media are learned using vibration detection devices 40, such as accelerometers, as shown in FIG. 23. Then, with regard to the balance control system 10d, balancing actuators 16 and 17 are operated during a control phase, based on what was learned by employing the vibration detection devices 40, to counteract the predicted vibrations. Alternatively, with regard to the data head movement control system 10e, the data head 26 is moved, based on what was learned by employing the vibration detection devices, in anticipation of the vibrations during the control phase. Of course, this control may be provided in all three dimensions (tracking and focus mechanisms being controlled) if appropriately positioned vibration detection devices are used.

Figure 26:
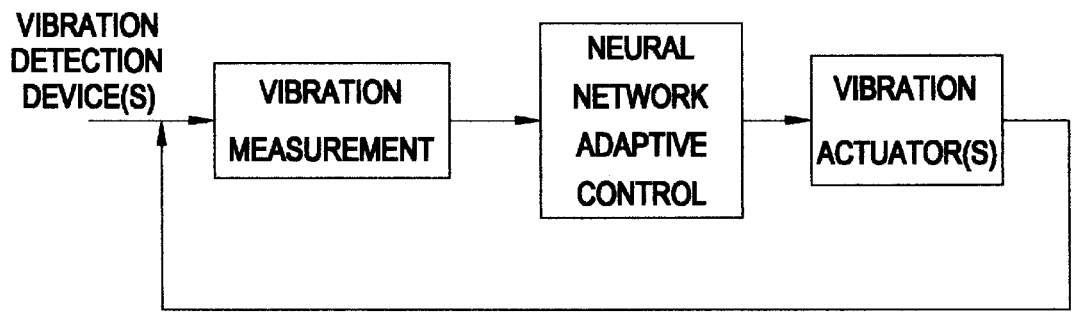
FIG. 26 is a block diagram illustrating the general underlying concept behind a balance control system depicted as a combination of FIGS. 23 and 24.
Figure 27:
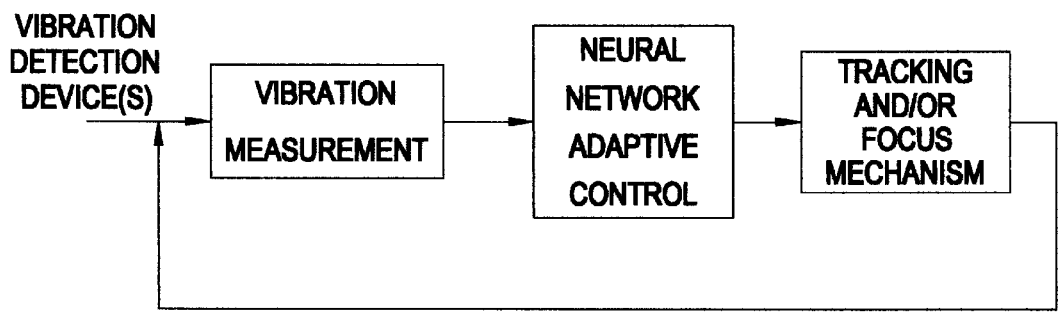
FIG. 27 is a block diagram illustrating the general underlying concept behind a data head movement control system depicted as a combination of FIGS. 24 and 25.

It is preferable to implement each of the control systems 10d and 10e as a feedforward control system or as a neural network whereby several data storage media are rotated and vibrations detected in order to learn the rotational imbalance of the rotating data storage media (the learning phase). Subsequently, either a data storage medium is balanced or the tracking and/or focus mechanisms are controlled during the control phase based on the characteristics learned. The general underlying concept of the control systems 10d and 10e are depicted in FIGS. 26 and 27, respectively.

The control systems 10d and 10e can also each be utilized as a feedback control system (essentially a second neural net) whereby that which is being detected by the vibration detection devices is used to fine tune the operation of the actuators 16 and 17 or tracking and/or focus mechanisms, respectively, while data is read from or written to a data storage medium 14 during the control phase. Of course, the control systems 10d and 10e can be utilized within the balancing sequence and other methods already described.

The balance control system 10 of FIGS. 1–5 provides that data tracks 32 on the data storage media are counted to learn the rotational imbalance characteristics of data storage media and then the actuators 16 are controlled based on what was learned by counting the data tracks the floating data head 26 crosses. In contrast, the balance control system 10b of FIGS. 12, 16 and 17 provides that the laser light beam 30 on rotating data storage media is analyzed to learn the rotational imbalance characteristics of the data storage media and then the actuator 17 is modulated based on what was learned by the analysis of the laser light beam 30. Still further, the balance control system of FIGS. 23 and 24 provides that vibrations are detected to learn the rotational imbalance characteristics of data storage media, and then actuators 16 and 17 are controlled based on what was learned.

The data head movement control system 10a of FIGS. 7–10 provides that data tracks 32 on data storage media are counted to learn the rotational imbalance characteristics of data storage media and then movement of the tracking mechanism 22 is controlled based on what was learned by counting the data tracks 32 the floating data head 26 crosses. In contrast, the data head movement control system 10c of FIGS. 19–21 provides that the laser light beam 30 on the rotating data storage media is "watched" to learn the rotational imbalance characteristics of data storage media and then movement of the tracking mechanism 22, in a plane generally perpendicular to the plane generally defined by the data storage medium 14, is controlled based on what was learned by "watching" the laser light beam 30. Still further, the data head movement control system 10e of FIGS. 23 and 25 provides that vibrations are detected to learn the rotational imbalance characteristics of data storage media and then the data head is moved based on what was learned.

Thus, the present invention provides a control system in a data storage apparatus for attempting to accommodate the vibrations resulting from rotating a data storage medium. Each of the embodiments comprises a neural network which utilizes detected vibrations resulting from the rotation of data storage media to learn the characteristics of the rotational imbalance of the rotating data storage media and subsequently control at least one of the rotation of a data storage medium or movement of a data head based on the characteristics learned.

As mentioned, the embodiments differ only in what exactly is monitored to learn the characteristics of the rotational imbalance of rotating data storage media and what exactly is subsequently done to attempt to accommodate the vibrations resulting from the rotation. In fact, the present invention even provides that the embodiments discussed can be essentially combined. For example, a floating data head 26 (detecting and counting the data tracks 32), a detector 34 ("watching" the laser light beam 30) and vibration detection devices 40 can be used to "learn" about the rotational imbalance characteristics of data storage media.

The present invention provides that the vibrations resulting from rotating a data storage medium can be accommodated by counter-action. Additionally, the present invention provides for adaption to different data storage media and speeds of rotation and that data can be reliably read from or written to a data storage medium, such as a CD-ROM disc or other removable or fixed data storage medium, which is rotating very quickly and possibly faster than the present state of the art.

What is claimed is:

1. In a data storage apparatus, a control system for attempting to accommodate vibrations resulting from rotating a data storage medium during a control phase, said control system comprising a neural network which utilizes detected vibrations resulting from a previous rotation of at least one data storage medium during a learning phase to learn the characteristics of the rotational imbalance of the at least one data storage medium and subsequently controls, during said control phase, at least one of the rotation of said data storage medium or movement of a tracking mechanism based on the characteristics learned during said learning phase.

2. The control system of claim 1, further comprising a balance control system for attempting to balance the rotating data storage medium during the control phase, the data storage medium having a plurality of data tracks thereon, and said balance control system comprising:

at least one balancing actuator contactable with the rotating data storage medium;

a data head associatable with the rotating data storage medium for at least one of reading data therefrom or writing data thereto, and capable of detecting data tracks on the rotating data storage medium;

control circuitry in communication with said data head for counting the data tracks on the rotating data storage medium detected by said data head; and a processor in communication with said control circuitry and said at least one balancing actuator, said processor receiving from said control circuitry information related to the data tracks detected by said data head and deriving balancing actuator direction information therefrom during said learning phase, said processor communicating said balancing actuator direction information to said at least one balancing actuator thereby altering the rotation of a data storage medium during said control phase.

3. The control system of claim 2, said at least one balancing actuator comprising three linear actuators.

4. The control system of claim 2, said data head comprising an undriven data head capable of at least one of reading data from or writing data to the data storage medium during said control phase, said data head floating in response to rotational imbalance of the rotating data storage medium and detecting data tracks on the rotating data storage medium while said data head is floating during said learning phase.

5. The control system of claim 2, said processor determining a range of oscillation of the data storage medium and deriving said balancing actuator direction information based on said range of oscillation during said learning phase.

6. The control system of claim 5, said neural network capable of adapting to different data storage media and speeds of rotation during said control phase.

7. The control system of claim 1, further comprising a data head movement control system for tracking data tracks on the rotating data storage medium during said control phase, said data head movement control system comprising:

an undriven movable data head driveable and associatable with the rotating data storage medium for at least one of reading data therefrom or writing data thereto, said data head capable of detecting data tracks on the rotating data storage medium in both an undriven and driven state;

control circuitry in communication with said data head for counting the data tracks on the rotating data storage medium detected by said undriven data head and for controlling the movement of said data head; and a processor in communication with said control circuitry, said processor receiving from said control circuitry information related to the data tracks detected by said data head and deriving data head movement direction information therefrom during said learning phase, said processor communicating said data head movement direction information to said control circuitry thereby dictating the control of movement of said data head while said data head at least one of reads data from or writes data to said rotating data storage medium during said control phase.

8. The control system of claim 7, said data head comprising an undriven data head floating in response to rotational imbalance of the rotating data storage medium during said learning phase, said data head detecting data tracks on the rotating data storage medium while said data head is floating.

9. The control system of claim 7, said processor determining a range of oscillation of the data storage medium and deriving said data head movement direction information based on said range of oscillation during said learning phase.

10. The control system of claim 9, said neural network capable of adapting to different data storage media and speeds of rotation during said control phase.

11. The control system of claim 1, further comprising a balance control system for attempting to balance the rotating data storage medium during said control phase, the data storage medium having a plurality of data tracks thereon, and said balance control system comprising:

at least one balancing actuator contactable with the rotating data storage medium;

a data head tracking mechanism associatable with the rotating data storage medium for directing a light beam to the rotating data storage medium;

a detector for detecting the light beam on the rotating data storage medium; and a processor in communication with said detector and said at least one balancing actuator, said processor receiving from said detector information related to the light beam on the data storage medium and deriving balancing actuator direction information therefrom during said learning phase, said processor communicating said balancing actuator direction information to said at least one balancing actuator thereby altering the rotation of a data storage medium during said control phase.

12. The control system of claim 11, said detector optically sensing the shape of said light beam on the rotating data storage medium.

13. The control system of claim 11, said processor determining a range of oscillation of the data storage medium and deriving said balancing actuator direction information based on said range of oscillation during said learning phase.

14. The control system of claim 13, said neural network capable of adapting to different data storage media and speeds of rotation during said control phase.

15. The control system of claim 1, further comprising a data head movement control system for tracking data tracks on the rotating data storage medium during said control phase, said data head movement control system comprising:
   a data head associatable with the rotating data storage medium for directing a light beam to the rotating data storage medium;
   a detector for detecting the light beam on the rotating data storage medium; and
   a processor in communication with said detector and said data head, said processor receiving from said detector information related to the light beam detected by said detector and deriving data head movement direction information therefrom during said learning phase, said processor communicating said data head movement direction information to at least one data head movement device thereby dictating the control of movement of said data head while said data head at least one of reads data from or writes data to said rotating data storage medium during said control phase.

16. The control system of claim 15, said processor determining a range of oscillation of the data storage medium and deriving said data head movement direction information based on said range of oscillation during said learning phase.

17. The control system of claim 16, said neural network capable of adapting to different data storage media and speeds of rotation during said control phase.

18. The control system of claim 1, further comprising a balance control system for attempting to balance the rotating data storage medium during said control phase, said balance control system comprising:
   at least one balancing actuator contactable with the rotating data storage medium;
   at least one vibration detection device for detecting vibrations resulting from rotating the data storage medium; and
   a processor in communication with said at least one balancing actuator and said at least one vibration detection device, said processor receiving information from said at least one vibration detection device related to vibrations detected thereby and deriving balancing actuator direction information therefrom during said learning phase, said processor communicating said balancing actuator direction information to said at least one balancing actuator thereby altering the rotation of the data storage medium during said control phase.

19. The control system of claim 18, said at least one vibration detection device comprising a plurality of devices for detecting vibrations in three dimensions during said learning phase and a plurality of linear actuators for altering the rotation of a data storage medium in three dimensions during said control phase.

20. The control system of claim 18, said processor determining a range of oscillation of the data storage medium and deriving said balancing actuator direction information based on said range of oscillation during said learning phase.

21. The control system of claim 20, said neural network capable of adapting to different data storage media and speeds of rotation during said control phase.

22. The control system of claim 19, wherein said vibration detection devices comprise accelerometers.

23. The control system of claim 1, further comprising a data head movement control system for tracking data tracks on the rotating data storage medium during said control phase, said data head movement control system comprising:
   a data head associatable with said data storage medium for following said data tracks on the rotating data storage medium;
   at least one vibration detection device for detecting vibrations resulting from rotating said data storage medium; and
   a processor in communication with said data head and said at least one vibration detection device, said processor receiving information from said at least one vibration detection device related to vibrations detected thereby and deriving data head movement direction information during said learning phase, said processor communicating said data head movement direction information to at least one data head movement device thereby dictating the control of movement of said data head while said data head at least one of reads data from or writes data to the rotating data storage medium during said control phase.

24. The control system of claim 23, said at least one vibration detection device comprising a plurality of accelerometers for detecting vibrations in three dimensions during said learning phase.

25. The control system of claim 23, said processor determining a range of oscillation of the data storage medium and deriving said data head movement direction information based on said range of oscillation during said learning phase.

26. The control system of claim 25, said neural network capable of adapting to different data storage media and speeds of rotation during said control phase.

27. A method of attempting to accommodate vibrations resulting from rotating a data storage medium in a data storage apparatus during a control phase, said method comprising:
   rotating at least one data storage medium during a learning phase;
   detecting vibrations resulting from the rotation of said at least one data storage medium;
   determining the characteristics of the rotational imbalance of the rotating data storage medium based on the vibrations detected during said learning phase; and
   controlling at least one of the rotation of a data storage medium or movement of a data head during a control phase based on the characteristics of the rotational imbalance of the at least one rotating data storage medium while at least one of reading data from or writing data to said rotating data storage medium during said control phase.

28. The method of 27, further comprising the steps of:
   detecting data tracks on the rotating data storage medium using said data head, said data head being associatable with the data storage medium for at least one of reading data therefrom or writing data thereto;
   counting the data tracks detected by said data head;

deriving balancing actuator direction information from the number of data tracks counted during said learning phase; and using said balancing actuator direction information to control at least one balancing actuator contactable with the data storage medium to alter the rotation of said rotating data storage medium during said control phase.

29. The method of claim 28, said method further comprising allowing said data head to float in response to rotational imbalance of said rotating data storage medium during said learning phase.

30. The method of claim 29, further comprising the steps of determining a range of oscillation of the data storage medium and deriving said balancing actuator direction information based on said range of oscillation during said learning phase.

31. The method of claim 27, further comprising the steps of:

detecting data tracks on the rotating data storage medium using an undriven data head driveable and associatable with the data storage medium for at least one of reading data therefrom or writing data thereto;

counting the data tracks detected by said data head;

deriving data head movement direction information from the number of data tracks counted during said learning phase; and using said data head movement direction information to control the movement of said data head while said data head at least one of reads data from or writes data to the rotating data storage medium during said control phase.

32. The method of claim 30, said method further comprising allowing said data head to float in response to rotational imbalance of said rotating data storage medium during said learning phase.

33. The method of claim 30, further comprising the steps of determining a range of oscillation of the data storage medium and deriving said balancing actuator direction information based on said range of oscillation during said learning phase.

34. The method of claim 27, further comprising the steps of:

rotating the data storage medium;

directing a light beam on the rotating data storage medium;

detecting the light beam on the rotating data storage medium;

deriving balancing actuator direction information from that which is detected during said learning phase; and using said balancing actuator direction information to control at least one balancing actuator contactable with the data storage medium to alter the rotation of said rotating data storage medium during said control phase.

35. The method of claim 34, further comprising optically sensing the shape of said light beam on the rotating data storage medium during said learning phase.

36. The method of claim 34, further comprising determining a range of oscillation of the rotating data storage medium and deriving said balancing actuator direction information based on said range of oscillation during said learning phase.

37. The method of claim 27, further comprising the steps of:

directing a light beam on the rotating data storage medium;

detecting the light beam on the rotating data storage medium;

deriving data head movement direction information from that which is detected during said learning phase; and using said data head movement direction information to control the movement of said data head while said data head at least one of reads data from or writes data to the rotating data storage medium during said control phase.

38. The method of claim 37, further comprising optically sensing the shape of said light beam on the rotating data storage medium during said learning phase.

39. The method of claim 37, further comprising determining a range of oscillation of the rotating data storage medium and deriving said balancing actuator direction information based on said range of oscillation during said learning phase.

40. A method of attempting to balance a rotating data storage medium in a data storage apparatus during a control phase, said method comprising:

rotating at least one data storage medium during a learning phase;

detecting vibrations resulting from the rotation of said at least data storage medium; and controlling the rotation of the data storage medium based on the vibrations detected while at least one of reading data from or writing data to said rotating data storage medium during said control phase.

41. The method of claim 40, further comprising detecting data tracks on the data storage medium to detect the vibrations resulting from the rotation of said data storage medium during said learning phase and controlling at least one balancing actuator contactable with the rotating data storage medium to control the rotation thereof during said control phase.

42. The method of claim 41, further comprising using an undriven data head to detect the data tracks on the rotating data storage medium during said learning phase.

43. The method of claim 40, further comprising directing a light beam on said rotating data storage medium and detecting said light beam on said rotating data storage medium to detect the vibrations resulting from the rotation of said data storage medium during said learning phase and controlling at least one balancing actuator contactable with the rotating data storage medium to control the rotation thereof during said control phase.

44. The method of claim 27, further comprising the steps of:

while rotating the data storage medium substantially at a pre-determined rotational speed, allowing a data head to float in response to rotational imbalance of said rotating data storage medium during said learning phase, said data head capable of at least one of reading data from or writing data to a data storage medium during said control phase;

detecting data tracks on the rotating data storage medium using the floating data head;

counting the data tracks detected by said floating data head;

deriving balancing actuator direction information from the number of data tracks counted during said learning phase; and while driving said data head to at least one of read data from or write data to said data storage medium during said control phase, using said balancing actuator direction information to control at least one balancing actuator contactable with the data storage medium to alter the rotation of said rotating data storage medium in said data storage apparatus during said control phase.

45. The method of claim 27, further comprising the steps of:
- while rotating the data storage medium at a plurality of different rotational speeds during said learning phase, allowing a data head to float in response to rotational imbalance of said rotating data storage medium, said data head capable of at least one of reading data from or writing data to said data storage medium during said control phase;
- detecting data tracks on the rotating data storage medium using the floating data head;
- counting the data tracks detected by said floating data head;
- deriving balancing actuator direction information from the number of data tracks counted during said learning phase; and
- while driving said data head to at least one of read data from or write data to said data storage medium during said control phase, using said balancing actuator direction information to control at least one balancing actuator contactable with the data storage medium to alter the rotation of said rotating data storage medium in said data storage apparatus during said control phase.

46. The method of claim 27, further comprising the steps of:
- while rotating the data storage medium at a plurality of different rotational speeds, directing a light beam on said rotating data storage medium;
- detecting said light beam on the rotating data storage medium;
- deriving balancing actuator direction information from that which is detected during said learning phase; and
- while driving said data head to at least one of read data from or write data to said data storage medium during said control phase, using said balancing actuator direction information to control at least one balancing actuator contactable with the data storage medium to alter the rotation of said rotating data storage medium in said data storage apparatus during said control phase.

47. The method of claim 27, further comprising the steps of:
- while rotating the data storage medium at a plurality of different rotational speeds during said learning phase, allowing a data head to float in response to rotational imbalance of said rotating data storage medium, said data head capable of at least one of reading data from or writing data to said data storage medium during said control phase;
- detecting data tracks on the rotating data storage medium using the floating data head;
- counting the data tracks detected by said floating data head;
- deriving data head movement direction information from the number of data tracks counted during said learning phase; and
- while driving said data head to at least one of read data from or write data to said data storage medium, using said data head movement direction information to control movement of the data head during said control phase.

48. The method of claim 27, further comprising the steps of:
- while rotating the data storage medium at a plurality of different rotational speeds during said learning phase, directing a light beam on said rotating data storage medium;
- detecting said light beam on the rotating data storage medium;
- deriving data head movement direction information from that which is detected during said learning phase; and
- while driving said data head to at least one of read data from or write data to said data storage medium, using said data head movement direction information to control movement of the data head during said control phase.

49. The method of 27, further comprising the steps of:
- using accelerometers to detect vibrations resulting from the rotation of said data storage medium during said learning phase.

* * * * *